United States Patent Office 3,022,186
Patented Feb. 20, 1962

3,022,186
MIXED PHASES WITH A RUTILE OR
POLYRUTILE STRUCTURE
Franz Hund, Krefeld-Bockum, Germany, assignor to Farbenfabriken Bayer Aktiengesellschaft, Leverkusen, Germany, a corporation of Germany
No Drawing. Filed Jan. 9, 1959, Ser. No. 785,776
Claims priority, application Germany Jan. 11, 1958
8 Claims. (Cl. 106—300)

This invention relates to mixed or solid solutions with a rutile or polyrutile structure.

It is known to heat titanium dioxide, especially anatase and also the hydroxide forms of 4-valent titanium, with the addition of different metal oxides or salts, partly in order to favour the conversion of anatase to rutile, partly in order to improve the pigment properties of white titanium dioxide and partly to produce coloured pigments. Thus, for example, oxides or salts of lithium, sodium, potassium, copper, beryllium, magnesium, calcium, strontium, barium, zinc, boron, aluminium, cerium, titanium (III), antimony (III), vanadium (III), chromium (III), manganese (III), rhodium (III), silicon, zirconium, antimony (V), vanadium (V), chromium (VI), tungsten (VI), uranium (VI) manganese (VII), cobalt, nickel and iron have been added in greater or lesser amounts, single or as mixtures of two or more such compounds, to titanium (IV) compounds during calcination. With the exception of those cases where such addition is made to simplify rutile formation and where it is a question only of a small addition of colourless components, all previous processes yield products which are crystallographically more or less undefined or indefineable. These known processes have been carried out arbitrarily with regard to such additions, not only in a qualitative but also in a quantitative respect.

Small quantities of oxides of vanadium and/or molybdenum, or of such compounds of these elements as are capable of changing under treatment or on heating into oxides, have already been added to tin dioxide and to zirconium dioxide or their mixtures, and the mixtures have been heat-treated in order to produce yellow pigments for ceramic and enamel purposes. As with the processes using titanium dioxide which have already been mentioned, the additives were in this case also chosen quite arbitrarily both with regard to quantity and quality so that no definite structure or high quality pigments were formed.

It has now been found that genuine mixed phases with a rutile or polyrutile structure are obtained by using as host components metal-oxygen or metal-fluorine compounds generally forming rutile or polyrutile lattices and incorporating into them as additional or guest components such metal oxides and/or fluorides the cations of which possess radii which are comparable with the radii of the metal ions or the statistical mean of the radii of the metal ions of the host components. The additional components are incorporated in such proportions relative to one another that the ratio of the sum of the added cations to the sum of the added anions, while preserving statistical electroneutrality in the lattice, is substantially 1:2. The total proportion of the additional components may on the other hand be of any desired value, but the amount is preferably not greater than approximately the total amount of the host components.

Such genuine mixed phases constitute white or coloured pigments which are particularly outstanding as regards their pigment properties, and more especially their colour intensity, as compared with all prior known mixed products with a rutile or polyrutile structure.

As is known, in the simplest case the rutile lattice consists of a tetragonal elementary cell with two molecules of specific metal dioxides or difluorides, the oxygen or fluorine ions being arranged in a distorted octahedron around the metal ions. By a suitable combination of trivalent and pentavalent metal oxides instead of dioxides, however, rutile lattices in which the two metal ions of different valency are statistically distributed are formed. Representatives of this group are for example antimonates, tantalates, niobates and vanadates of certain trivalent metals. Finally, a trirutile or polyrutile lattice, instead of the normal rutile lattice is formed by combining a suitable monovalent or divalent metal oxide with three molecules and one molecule, respectively, of metal pentoxide. In this case, a subordinate distribution of the monovalent or divalent and pentavalent metal ions takes place with trebling or multiplication of the c-axis of the tetragonal cell.

Host components which form rutile or polyrutile lattices include in particular the following:

$TiO_2$ and $SnO_2$ as well as $AlSbO_4$, $GaSbO_4$, $VSbO_4$, $CrSbO_4$, $FeSbO_4$ and $RhSbO_4$, $LiSb_3O_8$, $MgSb_2O_6$, $ZnSb_2O_6$, $FeSb_2O_6$, $CoSb_2O_6$, $CuSb_2O_6$; also $\beta$-$MnO_2$, $PbO_2$, $VO_2$, $GeO_2$, $TeO_2$, $CrO_2$, $RuO_2$, $OsO_2$, $IrO_2$, $CrTaO_4$, $FeTaO_4$, $RhTaO_4$, $CrNbO_4$, $FeNbO_4$, $RhNbO_4$, $RhVO_4$ and $MgF_2$, $ZnF_2$, $MnF_2$, $FeF_2$, $CoF_2$, $NiF_2$, $PdF_2$ as well as $MgTa_2O_6$, $NiTa_2O_6$, $CoTa_2O_6$, $FeTa_2O_6$, $NiSb_2O_6$.

The radii of the metal ions of these various host components are:

Magnesium=0.78 A., zinc=0.83 A., manganese (II)=0.91 A., iron (II)=0.82 A., cobalt (II)=0.82 A., nickel (II)=0.78 A., palladium (II)=0.80 A., titanium (IV)=0.64 A., tin (IV)=0.74 A., manganese (IV)= 0.52 A., lead (IV)=0.84 A., vanadium (IV)=0.61 A., niobium (IV)=0.69 A., germanium (IV)=0.53 A., tellurium (IV)=0.89 A., chromium (IV)=<0.64 A., ruthenium (IV)=0.68 A., osmium (IV)=0.67 A. and iridium (IV)=0.66 A.

The statistical mean of the radii of the metal ions of the combined host components is:

$(LiSb_3)(XVI)$=0.66 A.,
$(MgSb_2)(XII)$=0.67 A., $(ZnSb_2)(XII)$=0.69 A.,
$(FeSb_2)(XII)$=0.69 A., $(CoSb_2)(XII)$=0.69 A.,
$(NiSb_2)(XII)$=0.67 A., $(CuSb_2)(XII)$=0.65 A.,
$(AlSb)(VIII)$=0.60 A., $(GaSb)(VIII)$=0.62 A.,
$(VSb)(VIII)$=0.64 A., $(CrSb)(VIII)$=0.63 A.,
$(FeSb)(VIII)$=0.65 A., $(RhSb)(VIII)$=0.65 A.,
$(CrTa)(VIII)$=0.66 A., $(FeTa)(VIII)$=0.68 A.,
$(RhTa)(VIII)$=0.68 A., $(CrNb)(VIII)$=0.67 A.,
$(FeNb)(VIII)$=0.68 A., $(RhNb)(VIII)$=0.69 A.,
$(RhV)(VIII)$=0.64 A.,
$(MgTa_2)(XII)$=0.71 A., $(NiTa_2)(XII)$=0.71 A.,
$(CoTa_2)(XII)$=0.73 A., $(FeTa_2)(XII)$=0.73 A.

By proceeding in accordance with the requirements specified above, it is now possible according to my invention to incorporate into host components forming the said rutile or polyrutile lattices those metal oxides and/or fluorides the cations of which possess radii which are in every case comparable with the radii of the metal ions or the statistical mean of the radii of the metal ions of the host components. Examples of metal oxides and fluorides of this type are those of lithium, magnesium, zinc, manganese (II) ion radius=0.91 A., iron (II), cobalt (II), nickel (II), vanadium (II) (for ion radii, see above), copper (II), (ion radius=0.72 A.), aluminium (ion radius=0.57 A.), gallium (ion radius=0.62 A.), titanium (III), (ion radius=0.69 A.), arsenic (III) (ion radius=0.69 A.), antimony (III) (ion radius=0.90 A.), vanadium (III) (ion radius=0.65 A.), niobium (III)

(ion radius >0.69 A.), tantalum (III) (ion radius >0.68 A.), chromium (III) (ion radius=0.64 A.), manganese (III) (ion radius=0.70 A.), iron (III) (ion radius =0.67 A.), rhodium (III) (ion radius=0.68 A.), germanium (IV), lead (IV), vanadium (IV), tellurium (IV), chromium (IV), ruthenium (IV), osmium (IV), iridium (IV), (for ion radii, see above), tin (IV) (ion radius=0.74 A.), zirconium (IV) (ion radius=0.87 A.), hafnium (IV) (ion radius=0.84 A.), antimony (V) (ion radius=0.62 A.), bismuth (V) (ion radius=0.74 A.), vanadium (V) (ion radius=0.59 A.), niobium (V) (ion radius=0.69 A.), tantalum (V) (ion radius=0.68 A.), molybdenum (VI) (ion radius=0.62 A.), tungsten (VI) (ion radius=0.62 A.), uranium (VI) (ion radius=0.80 A.) and tellurium (VI) (ion radius=0.56 A.).

Metal compounds such as those of sodium, potassium, beryllium, calcium, strontium, barium, boron, silicon, cerium (IV), chromium (VI) and manganese (VII), which have also previously been added to, for example, titanium oxide, are not to be considered for use in making genuine mixed phases according to the invention since, even apart from their probable unfavourable thermostability, their ion radii are not comparable with those of the host components.

Examples of combinations of additional components to be used for forming the mixed phases according to the invention and which satisfy the requirement that the ratio of the sum of the added cations shall be substantially 1:2, to the sum of the added anions, while preserving statistical electroneutrality on the lattice, are one molecule of arsenic (V)-, antimony (V)- and/or bismuth (V)- and/or niobium (V)- and/or tantalum (V)- and/or 1 molecule of molybdenum (VI)- and/or tungsten (VI)- and/or uranium (VI)- and/or tellurium (VI)-oxides to 1 molecule of nickel (II)-, cobalt (II)-, magnesium-, zinc-, manganese (II)-, iron (II) or copper (II)-oxides, or 1 molecule of arsenic (V), antimony (V) and/or bismuth (V)- and/or niobium (V)- and/or tantalum (V)- and/or molybdenum (VI) and/or tungsten (VI) and/or uranium (VI)- and/or tellurium (VI)- oxides to 1 molecule of aluminium-, gallium-, arsenic (III)-, antimony (III)-, vanadium (III)-, chromium (III)-, manganese (III)-, iron (III)- or rhodium (III)-oxides, or 3 molecules of arsenic (V)-, antimony (V)-, bismuth (V)-, niobium (V)-oxides or tantalum (V)- and/or 3 molecules of molybdenum (VI)- and/or tungsten (VI)- and/or uranium (VI)- and/or tellurium (VI)-oxides and, if necessary, one or more molecules of germanium (IV)-, tin (IV)-, lead (IV)-, zirconium (IV)- and/or hafnium (IV)-oxides to 1 molecule of lithium oxide. The monovalent, divalent, trivalent and tetravalent oxides of the said types can be combined in any desired manner with the said penta- or hexavalent oxides. In all cases, it is however necessary to satisfy the requirement that the ratio of the sum of the added cations to the sum of the added anions shall be substantially 1:2, while preserving statistical electroneutrality in the lattice. Furthermore, mixed phases can, for example, consist of titanium dioxides or tin dioxide and the difluorides of divalent metals, for example Mg, Zn, Mn(II), Fe(II), Co(II), Ni(II) or Cu(II). In this case, with the exception of $CuF_2$, the added difluorides crystallise in the rutile lattice. The said difluorides can be incorporated singly, severally or all together into the rutile lattice.

Other mixed phases can, moreover, be formed using mixtures of equimolecular parts of a trifluoride and of a fluoride of a monovalent metal, for example $AlF_3+LiF$, $GaF_3+LiF$, $CrF_3+LiF$, $MnF_3+LiF$ or $FeF_3+LiF$, as guest or additional components.

By the simultaneous incorporation of, for example, $1LiF+1AlF_3$, altogether 2 cations and 4 anions enter into the host lattice; the sum of the cation charges amounts to +4; the sum of the anion charges is −4, and the statistical electroneutrality is thus preserved.

The additions mentioned above can in some cases be incorporated singly, in combination with some others or all together into the host lattice.

Mixed phases can moreover contain a mixture of 3 molecules of metal trifluoride with 1 molecule of monovalent metal oxide, for example the combination of 3 metal trifluoride+lithium oxide. If, for example, 3 molecules of $CrF_3$ with 1 molecule of $Li_2O$ are simultaneously incorporated into the titanium dioxide lattice, then $3Cr^{3+}+2Li^{1+}$, i.e. 5 cations, and $9F^{1-}+1O^{2-}$, i.e. 10 anions, enter the lattice. The sum of the incorporated cation charges is +11, the sum of the anion charges introduced is −11, and therefore statistical electroneutrality is preserved. Suitable trifluorides for this form of incorporation are $AlF_3$, $GaF_3$, $CrF_3$, $MnF_3$ and $FeF_3$. The separate trifluorides can be used alone, severally or all simultaneously for incorporation into the host lattice.

Further, mixed phases can, for example, consist of the host component and a mixture of equimolecular parts of a trifluoride and a divalent metal oxide, for example the combination of $1FeF_3$ and $1ZnO$; in this example $1Fe^{3+}$ and $1Zn^{2+}$ (=2 cations) and $3F^{1-}$ and $1O^{2-}$ (=4 anions) simultaneously enter the host lattice; the sum of the cation charge introduced is +5 and that of the anion charge is −5, and therefore statistical electroneutrality is preserved. The trifluorides are the same as those mentioned above; examples of suitable metal oxides are the oxides of Mg, Zn, Mn(II), Fe(II), Co(II), Ni(II) and Cu(II). The trifluorides and the divalent metal oxides can be used singly or in combination without the mixed phase being changed in its crystal structure.

Furthermore, mixed phases can be obtained using an equimolecular mixture of metal trifluoride and trivalent metal oxide as additional components. The system $CrF_3+Cr_2O_3$ is to be mentioned as a simple example of this type of incorporation; in this example $3Cr^{3+}$ (=3 cations) and $3F^{1-}$ and $3O^{2-}$ (=6 anions) simultaneously enter the lattice. The sum of the entering cation charges is +9 and the corresponding sum of the anion charges is −9. Statistical electroneutrality thus prevails in this case also. Trifluorides, which can be considered for use are again those mentioned above; the trivalent metal oxides contain the same metals as those of the said trifluorides. The trifluorides can each individually or all together be combined with one individual sesquioxide or with all the sesquioxides, the corresponding rutile phase nevertheless being maintained.

Other mixed phases can contain an equimolecular mixture of pentavalent metal oxides and monovalent metal fluoride. In the case of the mixture of $Sb_2O_5$ with $LiF$, $2Sb^{5+}$ and $1Li^{1+}$ (=3 cations and $5O^{2-}$ and one $F^{1-}$ (=6 anions) simultaneously enter the lattice. The sum of the cation charges introduced is +11 and that of the anion charges is −11; statistical electroneutrality thus prevails in this case also. Examples of other suitable pentavalent metal oxides for incorporation are the pentoxide of arsenic, antimony, bismuth, vanadium, niobium and tantalum. Here also, one, some or all of the aforementioned pentoxides can be combined with lithium fluoride.

Further mixed phases can consist of, for example, the host component and an equimolecular mixture or hexavalent metal oxide and monovalent metal fluoride. A simple example of these additives is the system $WO_3$ and $LiF$. In this case $1W^{6+}$ and $1Li^{1+}$ (=2 cations) and $3O^{2-}$ and $1F^{1-}$ (=4 anions) simultaneously enter the host lattice as additional substances or guests. The sum of the entering cation charges is +7 and that of the entering anion charges is −7; statistical electroneutrality therefore prevails. Examples of trioxides which can be considered are those of molybdenum, tungsten, uranium and tellurium. Here also, the different trioxides can be combined singly or in combination with lithium fluoride.

Finally, we would mention mixed phases with a combination of one or more or all of the individual guest systems. The large possibilities of variation set out in detail are particularly increased in that some or all of the large series of variations referred to above can themselves be combined one with another and in spite of this large number of possible variations, a mixed phase is always formed in the structure of the rutile or polyrutile.

How very important it is to keep as accurately as possible to the rule that the sum of the added cations bears a ratio substantially of 1:2 to the sum of the added anions, while preserving a statistical electroneutrality in the lattice, can be shown from the following example:

If 5.0 grams $TiO_2$ (as $TiCl_4$) and 0.5 gram NiO (as $Ni(NO_3)_2$) are added to different amounts of $Sb_2O_5$ (as $SbCl_5$ solution), (i.e. 2.166 grams $Sb_2O_5$ corresponding exactly to the ratio $NiO:Sb_2O_5=1:1$), followed by 0.05 gram NaF (fluidising agent), and the mixture then evaporated and calcined by heating to 800–1200° C., lemon yellow pigments are obtained whose colour strengths as measured by rubbing with synthetic barium sulphate are as follows.

| Molar raito of $NiO:Sb_2O_5$: | Colour strength |
|---|---|
| 1:1 | 1.0 |
| 1:0.95 | 1.0–0.9 |
| 1:0.9 | 1.0–0.9 |
| 1:0.85 | 0.7–0.6 |
| 1:0.8 | 0.7–0.6 |
| 1:0.7 | 0.5 |

Thus, if the amounts of the two or more 5- and/or 6- and 3-, 2- and/or 1-valent metal oxides or fluorides which can be contained in the mixed phases as additional components are co-ordinate relatively with one another, then the ratio of the titanium dioxide component to the total additional components can vary within wide limits. Nevertheless, in general, a content of the total additional components of between about 0.5 and about 50 percent is of special interest.

The production of the mixed phases, in principle, proceeds in that a mixture of the components are converted into the mixed phases at elevated temperatures, particularly at red heat. In this case, heat labile compounds of the various metals, instead of the oxide components can be used, which compounds are converted by heating into the components of the mixed phase. Thus, for example, the hydrate of titanium dioxide can be used instead of titanium dioxide and is converted by heating into this dioxide. Instead of the oxides of the metals, such for example as magnesium oxide or zinc oxide, their hydroxides, carbonates, acetates, nitrates or formates can for example be used. If desired, small amounts of a fluidising agent, such as lithium or sodium fluoride, can be added to the mixtures in order to simplify the formation of mixed crystals.

When using as initial components metal compounds of low valency which are to maintain this valency in the final product, i.e. in the mixed phase, it can be necessary to carry out the heating mixture in an inert gas atmosphere with the exclusion of oxygen.

The following examples describe the production of typical representatives of the new mixed phases according to the invention:

EXAMPLE 1

5.000 grams of anatase+0.020 gram of $Li_2O$ (calculated from $Li_2CO_3$)+0.466 gram of $WO_3$ (calculated from $H_2WO_4$) are well mixed, calcined for half an hour at 800° C. and, after further pulverising, for half an hour at 1000° C. A white to light grey pigment which, according to X-ray analysis, has a rutile structure is obtained.

EXAMPLE 2

5.000 grams of anatase+0.050 gram of MgO (calculated from $MgCO_3$)+0.288 gram of $WO_3$ (calculated from $H_2WO_4$) are well mixed, calcined for half an hour at 800° C. and, after further pulverising, for half an hour at 1000° C. A white to greenish grey-white pigment which, according to X-ray analysis, has a rutile structure is obtained.

EXAMPLE 3

5.000 grams of anatase+0.200 gram of ZnO (calculated from $ZnCO_3$)+0.570 gram of $WO_3$ (calculated from $H_2WO_4$) are well mixed, calcined for half an hour at 800° C. and, after further pulverising, for half an hour at 1000° C. A yellowish-white pigment having the crystal structure of rutile is obtained.

EXAMPLE 4

5.000 grams of anatase+0.200 gram of $Al_2O_3$ (calculated from active aluminium oxide hydrate)+0.455 gram of $WO_3$ (calculated from $H_2WO_4$) are well mixed, calcined for half an hour at 800° C. and, after further pulverising, for half an hour at 1000° C. A grey white pigment of rutile structure is obtained.

EXAMPLE 5

5.000 grams of anatase+0.200 gram of MnO (calculated from $MnCO_3$)+0.654 gram of $WO_3$ (calculated from $H_2WO_4$) are well mixed, calcined for half an hour at 800° C. and, after further pulverising, at 1000° C. A dark red-brown pigment which, according to X-ray analysis, has a rutile structure is obtained.

EXAMPLE 6

5.000 grams of anatase+0.500 gram of FeO (calculated from $FeCO_3$)+1.615 grams of $WO_3$ (calculated from $H_2WO_4$) are well mixed, calcined for half an hour at 800° C. and, after further pulverising, for half an hour at 1000° C. An olive green pigment which, according to X-ray examination, has a rutile structure is obtained.

EXAMPLE 7

5.000 grams of anatase+0.200 gram of CoO (calculated from $CoCO_3$)+0.620 of $WO_3$ (calculated from $H_2WO_4$) are well mixed, calcined for half an hour at 800° C. and, after further pulverising, for half an hour at 1000° C. A reddish light brown pigment which has a rutile structure is obtained.

EXAMPLE 8

5.000 grams of anatase+0.200 gram of NiO (calculated from $NiCO_3$)+0.620 gram of $WO_3$ (calculated from $H_2WO_4$) are well mixed, calcined for half an hour at 800° C. and, after further pulverising, for half an hour at 1000° C. A beautiful and completely canary yellow pigment having a rutile structure is obtained.

EXAMPLE 9

5.000 grams of anatase+0.100 gram of NiO (calculated from $NiCO_3$)+0.310 gram of $WO_3$ (calculated from $H_2WO_4$)+0.050 gram of NaF are well mixed, calcined for half an hour at 800° C. and, after further pulverising, for half an hour at 1000° C. A full clean bright canary-yellow pigment having the structure of rutile is obtained.

EXAMPLE 10

5.000 grams of anatase+0.500 gram of CuO (calculated from $CuCO_3$)+1.450 grams of $WO_3$ (calculated from $H_2WO_4$) are well mixed, calcined for half an hour at 800° C. and, after further pulverising, for half an hour at 1000° C. A dark olive-coloured pigment of the rutile type is obtained.

EXAMPLE 11

5.000 grams of anatase+0.100 gram of CuO (calculated from $CuCO_3$)+0.290 gram of $WO_3$ (calculated from $H_2WO_4$) are well mixed, calcined for half an hour at 1000° C. A pale green pigment having a rutile structure is obtained.

EXAMPLE 12

5.000 grams of anatase+0.200 gram of $Cr_2O_3$+0.306 gram of $WO_3$ (calculated from $H_2WO_4$) are well mixed, calcined for half an hour at 800° C. and, after further pulverising, for half an hour at 1000° C. A brown-orange pigment which, according to X-ray analysis, has a rutile structure is obtained.

EXAMPLE 13

5.000 grams of anatase+0.100 gram of MnO (calculated from $MnCO_3$)+0.1636 gram of $WO_3$ (calculated from $H_2WO_4$) are mixed well, calcined for half an hour at 800° C. and, after further pulverising, for half an hour at 1000° C. A pale pink to reddish brown pigment having the structure of rutile is obtained.

EXAMPLE 14

5.000 grams of anatase+0.500 gram of $Fe_2O_3$+0.726 gram of $WO_3$ (calculated from $H_2WO_4$) are mixed well, calcined for half an hour at 800° C. and, after further pulverising, for half an hour at 1000° C. A yellowish pale green pigment having a rutile structure is obtained.

EXAMPLE 15

5.000 grams of anatase+0.200 gram of NiO (calculated from $NiCO_3$)+0.347 gram of $Sb_2O_5$+0.372 gram of $WO_3$ (calculated from $H_2WO_4$)+0.200 gram of NaF are mixed well, calcined for half an hour at 800° C. and, after further pulverising, for half an hour at 1000° C. A canary-yellow pigment is obtained having the crystal structure of rutile.

EXAMPLE 16

5.000 grams of anatase+0.200 gram of NiO (calculated from $NiCO_3$)+0.195 gram of $V_2O_5$ (calculated from $NH_4VO_3$)+0.372 gram of $WO_3$ (calculated from $H_2WO_4$)+0.200 gram of NaF are mixed well, calcined for half an hour at 800° C. and, after further pulverising, for half an hour at 1000° C. An orange pigment which has a dirty greenish cast and which, according to X-ray analysis, has a rutile structure is obtained.

EXAMPLE 17

5.000 grams of anatase+0.200 gram of CuO (calculated from $CuCO_3$)+0.487 gram of $Sb_2O_5$+0.233 gram of $WO_3$ (calculated from $H_2WO_4$) are mixed well, calcined for half an hour at 800° C. and, after further pulversing, for half an hour at 1000° C. A dirty pale green pigment having a rutile structure is obtained.

EXAMPLE 18

5.000 grams of anatase+0.200 gram of CuO (calculated from $CuCO_3$)+0.183 gram of $V_2O_5$ (calculated from $NH_4VO_3$)+0.350 gram of $WO_3$ (calculated from $H_2WO_4$) are well mixed, calcined for half an hour at 800° C. and, after further pulverising, for half an hour at 1000° C. A medium brown pigment having the crystal structure of rutile is obtained.

EXAMPLE 19

5.000 grams of anatase+0.050 gram of CuO (calculated from $CuCO_3$)+0.050 gram of NiO (calculated from $NiCO_3$)+0.300 gram of $WO_3$ (calculated from $H_2WO_4$) are well mixed, calcined for half an hour at 800° C. and, after further pulverising, for half an hour at 1000° C. A yellow pale green pigment with the crystal structure of rutile is obtained.

EXAMPLE 20

5.000 grams of anatase+0.100 gram of CoO (calculated from $CoCO_3$)+0.100 gram of NiO (calculated from $NiCO_3$)+0.620 gram of $WO_3$ (calculated from $H_2WO_4$) are well mixed, calcined for half an hour at 800° C. and, after further pulverising, for half an hour at 1000° C. An orange pigment having the structure of rutile is obtained.

EXAMPLE 21

5.000 grams of anatase+0.100 gram of NiO (calculated from $NiCO_3$)+0.100 gram of $Cr_2O_3$+0.463 gram of $WO_3$ (calculated from $H_2WO_4$) are mixed well, calcined for half an hour at 800° C. and, after further pulverising, for half an hour at 1000° C. An orange pigment with a brownish cast and having a rutile structure is obtained.

EXAMPLE 22

5.000 grams of anatase+0.100 gram of NiO (calculated from $NiCO_3$)+0.100 gram of CuO (calculated from $CuCO_3$)+0.433 gram of $Sb_2O_5$+0.290 gram of $WO_3$ (calculated from $H_2WO_4$) are well mixed, calcined for half an hour at 800° C. and, after further pulverising, for half an hour at 1000° C. A pale green pigment which, according to X-ray analysis, has a rutile structure is obtained.

EXAMPLE 23

5.000 grams of anatase+0.200 gram of NiO (calculated from $NiCO_3$)+0.200 gram of NaF+0.500 gram of $Bi_2O_5$ (calculated from $Bi_2O_3$)+0.372 gram of $WO_3$ (calculated from $H_2WO_4$) are well mixed, calcined for half an hour at 800° C. and after further pulverising, for half an hour at 1000° C. A canary-yellow pigment with a rutile structure is obtained.

EXAMPLE 24

5.000 grams of anatase+0.500 gram of NiO (calculated from $NiCO_3$)+1.163 grams of $WO_3$ (calculated from $H_2WO_4$)+0.479 gram of $UO_3$ (calculated from uranyl nitrate) are well mixed, calcined for half an hour at 800° C. and, after further pulverising, for half an hour at 1000° C. A greenish yellow pigment having the crystal structure of rutile is obtained.

EXAMPLE 25

5.000 grams of $TiO_2$ (calculated by a calcining loss from titanium hydroxide)+0.500 gram of NiO (calculated from $NiCO_3$)+0.775 gram of $WO_3$ (calculated from $H_2WO_4$)+0.482 gram of $MoO_3$+0.200 gram of NaF are well mixed, calcined for half an hour at 600° C. and, after further pulverising, for half an hour at 800° C. A browny-beige pigment which, according to X-ray examination, has a rutile structure is obtained.

EXAMPLE 26

5.000 grams of anatase+0.050 gram of $Li_2O$ (calculated from $Li_2CO_3$)+1.620 grams of $Sb_2O_5$ are mixed, calcined for half an hour at 800° C. and, after pulverising, for half an hour at 1000° C. A white pigment of the structure of rutile is obtained.

EXAMPLE 27

5.000 grams of anatase+0.050 gram of MgO (calculated from $MgCO_3$)+0.401 gram of $Sb_2O_5$ are mixed, calcined for half an hour at 800° C. and, after pulverising, for half an hour at 1000° C. A white pigment having a rutile structure is obtained.

EXAMPLE 28

5.000 grams of $TiO_2$ (calculated from titanium hydroxide sludge)+0.050 gram of MgO (calculated from $MgCO_3$)+0.401 gram of $Sb_2O_5$ are mixed, calcined for half an hour at 800° C. and, after pulverising, for half an hour at 1000° C. A white pigment is obtained. An X-ray photograph thereof indicated approximately 75% rutile structure and approximately 25% anatase structure.

EXAMPLE 29

5.000 grams of anatase+0.200 gram of ZnO (calculated from $ZnCO_3$)+0.796 gram of $Sb_2O_5$ are mixed,

EXAMPLE 30

5.000 grams of anatase + 0.500 gram of ZnO (calculated from $ZnCO_3$) + 1.988 grams of $Sb_2O_5$ are mixed, calcined for half an hour at 800° C. and, after pulverising, for half an hour at 1000° C. A white pigment having a rutile structure is obtained.

EXAMPLE 31

5.000 grams of anatase + 0.500 gram of $Al_2O_3$ (calculated from active $Al_2O_3$) + 1.588 grams of $Sb_2O_5$ are intensively mixed, calcined for half an hour at 800° C. and, after pulverising, for half an hour at 1000° C. A white pigment having a rutile structure is obtained.

EXAMPLE 32

5.000 grams of anatase + 0.100 gram of $Al_2O_3$ (calculated from active $Al_2O_3$) + 0.318 gram of $Sb_2O_5$ + 0.200 gram of NaF are mixed, calcined for half an hour at 800° C. and, after pulverising, for half an hour at 1000° C. A white pigment having a rutile structure is obtained.

EXAMPLE 33

5.000 grams of anatase + 0.500 gram of $Ga_2O_3$ + 0.863 gram of $Sb_2O_5$ are mixed, calcined for half an hour at 800° C. and, after pulverising, for half an hour at 1000° C. A white pigment having a rutile structure is obtained.

EXAMPLE 34

5.000 grams of anatase + 0.200 gram of $Sb_2O_3$ + 0.222 gram of $Sb_2O_5$ are mixed, calcined for half an hour at 800° C. and, after pulverising, for half an hour at 1000° C. A white pigment having a rutile structure is obtained.

EXAMPLE 35

5.000 grams of anatase + 0.020 gram of $Li_2O$ (calculated from $Li_2CO_3$) + 0.020 gram of MgO (calculated from $MgCO_3$) + 0.200 gram of $Al_2O_3$ (calculated from active $Al_2O_3$) + 0.200 gram of ZnO (calculated from $ZnCO_3$) + 2.241 grams of $Sb_2O_5$ are mixed, calcined for half an hour at 800° C. and, after pulverising, for half an hour at 1000° C. A white pigment having a rutile structure is obtained.

EXAMPLE 36

5.000 grams of anatase + 0.500 gram of ZnO (calculated from $ZnCO_3$) + 1.125 grams of $Sb_2O_5$ + 0.817 gram of $Nb_2O_5$ are mixed, calcined for half an hour at 800° C. and, after pulverising, for half an hour at 1000° C. A white pigment having a rutile structure is obtained.

EXAMPLE 37

5.000 grams of anatase + 0.020 gram of $Li_2O$ (calculated from $Li_2CO_3$) + 0.325 gram of $Sb_2O_5$ + 0.444 gram of $Ta_2O_5$ are mixed, calcined for half an hour at 800° C. and, after pulverising, for half an hour at 1000° C. A yellowish white pigment having a rutile structure is obtained.

EXAMPLE 38

5.000 grams of anatase + 0.020 gram of $Li_2O$ (calculated from $Li_2CO_3$) + 0.887 gram of $Ta_2O_5$ are mixed, calcined for half an hour at 800° C. and, after pulverising, for half an hour at 1000° C. A yellowish white pigment having a rutile structure is obtained.

EXAMPLE 39

5.000 grams of anatase + 0.500 gram of $V_2O_5$ (calculated from $NH_4VO_3$) + 0.027 gram of $Li_2O$ (calculated from $Li_2CO_3$) are mixed, calcined for half an hour at 800° C. and, after pulverising, for half an hour at 1000° C. A blackish brown substance which has the structure of rutile, according to X-ray analysis, and which also possesses pigment fineness is obtained.

EXAMPLE 40

5.000 grams of anatase + 0.500 gram of $V_2O_5$ (calculated from $NH_4VO_3$) + 0.111 gram of MgO (calculated from $MgCO_3$) are mixed, calcined for half an hour at 800° C. and, after pulverising, for half an hour at 1000° C. A dark violet brown pigment having a rutile structure is obtained.

EXAMPLE 41

5.000 grams of anatase + 0.500 gram of ZnO (calculated from $NH_4VO_3$) are mixed, calcined for half an hour at 800° C. and, after pulverising, for half an hour at 1000° C. A blackish grey pigment having a rutile structure is obtained.

EXAMPLE 42

5.000 grams of anatase + 0.200 gram of MnO (calculated from $MnCO_3$) + 0.513 gram of $V_2O_5$ (calculated from $NH_4VO_3$) are mixed, calcined for half an hour at 800° C. and, after pulverising, for half an hour at 1000° C. A dark brown pigment having a violet cast and the structure of rutile is obtained.

EXAMPLE 43

5.000 grams of anatase + 0.200 gram of FeO (calculated from $FeCO_3$) + 0.507 gram of $V_2O_5$ (calculated from $NH_4VO_3$) are mixed, calcined for half an hour at 800° C. and, after pulverising, for half an hour at 1000° C. A dark violet brown pigment having the structure of rutile is obtained.

EXAMPLE 44

5.000 grams of anatase + 0.200 gram of CoO (calculated from $CoCO_3$) + 0.486 gram of $V_2O_5$ (calculated from $NH_4VO_3$) are mixed, calcined for half an hour at 800° C. and, after further mixing, for half an hour at 1000° C. A deep dark brown pigment of a greenish cast and having the structure of rutile is obtained.

EXAMPLE 45

5.000 grams of anatase + 0.500 gram of NiO (calculated from $NiCO_3$) + 1.218 grams of $V_2O_5$ (calculated from $NH_4VO_3$) are mixed, calcined for half an hour at 800° C. and, after pulverising, for half an hour at 1000° C. A black-grey pigment having a bluish cast and which is of a rutile structure is obtained.

EXAMPLE 46

5.000 grams of anatase + 0.100 gram of NiO (calculated from $NiCO_3$) + 0.244 gram of $V_2O_5$ (calculated from $NH_4VO_3$) + 0.100 gram of NaF are mixed, calcined for half an hour at 800° C. and, after pulverising, for half an hour at 1000° C. A reddish yellow brown pigment having the structure of rutile is obtained.

EXAMPLE 47

5.000 grams of anatase + 0.200 gram of CuO (calculated from $CuCO_3$) + 0.457 gram of $V_2O_5$ (calculated from $NH_4VO_3$) are mixed, calcined for half an hour at 800° C. and, after pulverising, for half an hour at 1000° C. A grey pigment having a violet cast and the structure of rutile is obtained.

EXAMPLE 48

5.000 grams of anatase + 0.500 gram of $Al_2O_3$ (calculated from active $Al_2O_3$) + 0.893 gram of $V_2O_5$ (calculated from $NH_4VO_3$) are mixed, calcined for half an hour at 800° C. and, after pulverising, for half an hour at 1000° C. A black-grey pigment having the structure of rutile is obtained.

EXAMPLE 49

5.000 grams of anatase + 0.500 gram of $Ga_2O_3$ + 0.485 gram of $V_2O_5$ (calculated from $NH_4VO_3$) are mixed, calcined for half an hour at 800° C., and, after pulverising, for half an hour at 1000° C. A very dark brown pigment having a rutile structure is obtained.

EXAMPLE 50

5.000 grams of anatase+0.800 gram of $Sb_2O_3$+0.500 gram of $V_2O_5$ (calculated from $NH_4VO_3$) are mixed, calcined for half an hour at 800° C. and, after pulverising, for half an hour at 1000° C. A black-brown pigment of rutile structure is obtained.

EXAMPLE 51

5.000 grams of anatase+0.200 gram of $Cr_2O_3$+0.239 gram of $V_2O_5$ (calculated from $NH_4VO_3$) are mixed, calcined for half an hour at 800° C. and, after pulverising, for half an hour at 1000° C. A dark earth-brown pigment of rutile structure is obtained.

EXAMPLE 52

5.000 grams of anatase+0.500 gram of MnO (from $MnCO_3$ as source for $Mn_2O_3$)+0.641 gram of $V_2O_5$ (calculated from $NH_4VO_3$) are mixed, calcined for half an hour at 800° C. and, after pulverising, for half an hour at 1000° C. A dark grey pigment having a violet cast and a rutile structure is obtained.

EXAMPLE 53

5.000 grams of anatase+0.500 gram of $Fe_2O_3$+0.570 gram of $V_2O_5$ (calculated from $NH_4VO_3$) are mixed, calcined for half an hour at 800° C. and, after pulverising, for half an hour at 1000° C. A dark violet-brown pigment having the crystal structure of rutile is obtained.

EXAMPLE 54

5.000 grams of anatase+0.250 gram of NiO (calculated from $NiCO_3$)+0.250 gram of CuO (calculated from $CuCO_3$+1.183 grams of $V_2O_5$ (calculated from $NH_4VO_3$) are mixed, calcined for half an hour at 800° C. and, after pulverising, for half an hour at 1000° C. A dark brown greyish pigment having the structure of rutile is obtained.

EXAMPLE 55

5.000 grams of anatase+0.100 gram of MnO (calculated from $MnCO_3$)+0.100 gram of CoO (calculated from $CoCO_3$)+0.499 gram of $V_2O_5$ (calculated from $NH_4VO_3$) are mixed, calcined for half an hour at 800° C. and, after pulverising, for half an hour at 1000° C. A dark grey pigment with a violet cast and the structure of rutile is obtained.

EXAMPLE 56

5.000 grams of anatase+0.011 gram of $Li_2O$ (calculated from $Li_2CO_3$)+0.200 gram of $Fe_2O_3$+0.428 gram of $V_2O_5$ (calculated from $NH_4VO_3$) are mixed, calcined for half an hour at 800° C. and, after pulverising, for half an hour at 1000° C. A dark violet-brown pigment with a rutile structure is obtained.

EXAMPLE 57

5.000 grams of anatase+0.500 gram ZnO (calculated from $ZnCO_3$)+0.500 gram of $Cr_2O_3$+1.717 grams of $V_2O_5$ (calculated from $NH_4VO_3$) are mixed, calcined for half an hour at 800° C. and, after pulverising, for half an hour at 1000° C. A black-grey pigment of rutile structure is obtained.

EXAMPLE 58

5.000 grams of anatase+0.500 gram of NiO (calculated from $NiCO_3$)+0.609 gram of $V_2O_5$ (calculated from $NH_4VO_3$)+1.080 grams of $Sb_2O_5$ are mixed well, calcined for half an hour at 800° C. and, after pulverising, for half an hour at 1000° C. A pale reddish-brown pigment with a rutile structure is obtained.

EXAMPLE 59

5.000 grams of anatase+0.500 gram of MnO (calculated from $MnCO_3$)+0.642 gram of $V_2O_5$ (calculated from $NH_4VO_3$)+1.755 grams of $Bi_2O_5$ (calculated from $Bi_2O_3$) are mixed together, calcined for half an hour at 800° C. and, after pulverising, for a further half hour at 1000° C. A metallic grey pigment with a rutile structure is obtained.

EXAMPLE 60

5.000 grams of anatase+0.500 gram of CoO (calculated from $CoCO_3$)+0.304 gram of $V_2O_5$ (calculated from $NH_4VO_3$)+1.331 grams of $Nb_2O_5$ are mixed together, calcined for half an hour at 800° C. and, after pulverising, for half an hour at 1000° C. A deep brown pigment with a rutile structure is obtained.

EXAMPLE 61

5.000 grams of anatase+0.500 gram of NiO (calculated from $NiCO_3$)+0.304 gram of $V_2O_5$ (calculated from $NH_4VO_3$)+2.220 grams of $Ta_2O_5$ are mixed, calcined for half an hour at 800° C. and, after pulverising, for half an hour at 1000° C. A yellow-brown pigment of which approximately 10% has an anatase structure and approximately 90% a rutile structure is obtained.

EXAMPLE 62

5.000 grams of anatase+0.500 gram of ZnO (calculated from $ZnCO_3$)+0.559 gram of $V_2O_5$ (calculated from $NH_4VO_3$)+0.442 gram of $MoO_3$+0.200 gram of NaF are mixed well, calcined for half an hour at 700° C. and, after pulverising, for half an hour at 800° C. A grey-brown pigment which, according to X-ray analysis, has a rutile structure is obtained.

EXAMPLE 63

5.000 grams of anatase+0.500 gram of NiO (calculated from $NiCO_3$)+0.305 gram of $V_2O_5$ (calculated from $NH_4VO_3$)+1.433 grams of $UO_3$ (calculated from uranyl nitrate) are mixed, calcined for half an hour at 800° C. and, after pulverising, for half an hour at 1000° C. A medium brown pigment having rutile structure is obtained.

EXAMPLE 64

5.000 grams of anatase+0.100 gram of MgO (calculated from $MgCO_3$)+0.100 gram of MnO (calculated from $MnCO_3$)+0.010 gram of CoO (calculated from $CoCO_3$)+0.010 gram of $Fe_2O_3$+0.010 gram of $Cr_2O_3$+0.452 gram of $V_2O_5$ (calculated from $NH_4VO_3$)+0.456 gram of $Sb_2O_5$+0.065 gram of $Bi_2O_5$ (calculated from $Bi_2O_3$)+0.0179 gram of $UO_3$ (calculated from uranyl nitrate)+0.0175 gram of $Nb_2O_5$ are mixed, calcined for half an hour at 800° C. and, after pulverising, for half an hour at 1000° C. A dark brown pigment with a grey cast and of the structure of rutile is obtained.

EXAMPLE 65

5.000 grams of anatase+0.500 gram of MnO (calculated from $MnCO_3$)+2,280 grams of $Sb_2O_5$ are mixed, calcined for half an hour at 800° C. and, after pulverising, for half an hour at 1000° C. A medium brown pigment having a red cast and a rutile or trirutile structure is obtained.

EXAMPLE 66

5.000 grams of anatase+0.100 gram of FeO (calculated from $FeCO_3$)+0.450 gram of $Sb_2O_5$ are mixed, calcined for half an hour at 800° C. and, after pulverising, for half an hour at 1000° C. A grey pigment with a green cast, of which approximately 20% has an anatase structure and approximately 80% a rutile structure, is obtained.

EXAMPLE 67

5.000 grams of anatase+0.500 gram of FeO (calculated from $FeCO_3$)+2.250 grams of $Sb_2O_5$ are mixed, calcined for half an hour at 800° C. and, after pulverising, for half an hour at 1000° C. A grey pigment with a green cast and of pure rutile structure is obtained.

EXAMPLE 68

5.000 grams of anatase+0.500 gram of CuO (calculated from $CuCO_3$)+2.030 grams of $Cb_2O_5$ are mixed, calcined for half an hour at 800° C. and, after pulverising, for half an hour at 1000° C. A lemon-yellow pigment which has a rutile structure is obtained.

EXAMPLE 69

5.000 grams of anatase+0.200 gram of CuO (calculated from $CuCO_3$)+0.812 gram of $Sb_2O_5$+0.050 gram of NaF are mixed, calcined for half an hour at 800° C. and, after pulverising, for half an hour at 1000° C. A yellow pale green pigment having a rutile structure is obtained.

EXAMPLE 70

5.000 grams of anatase+0.500 gram of $V_2O_5$ (as source for $V_2O_3$)+0.889 gram of $Sb_2O_5$ are mixed, calcined for half an hour at 800° C. and, after pulverising for half an hour at 1000° C. A black-brown pigment having a rutile structure is obtained.

EXAMPLE 71

5.000 grams of anatase+0.100 gram of $Cr_2O_3$+0.213 gram of $Sb_2O_5$ are mixed, calcined for half an hour at 800° C. and, after pulverising, for half an hour at 1000° C. A yellow-olive pigment with the structure of rutile is obtained.

EXAMPLE 72

5.000 grams of anatase+0.500 gram of $Cr_2O_3$+1.070 g. of $Cb_2O_5$ are mixed, calcined for half an hour at 800° C. and, after pulverising, for half an hour at 1000° C. A yellow-brown pigment having the structure of rutile is obtained.

EXAMPLE 73

5.000 grams of anatase+0.556 gram of $Mn_2O_3$ (Mn(III)—) (calculated from $MnCO_3$)+1.140 grams of $Sb_2O_5$ are mixed, calcined for half an hour at 800° C. and, after pulverising, for half an hour at 1000° C. A chocolate-brown pigment having a rutile structure is obtained.

EXAMPLE 74

5.000 grams of anatase+0.200 gram of $Fe_2O_3$+0.405 gram of $Sb_2O_5$ are mixed, calcined for half an hour at 800° C. and, after pulverising, for half an hour at 1000° C. A grey-olive pigment, of which approximately 30% has an anatase structure and approximately 70% a rutile structure, is obtained.

EXAMPLE 75

5.000 grams of anatase+0.200 gram of $Fe_2O_3$+0.405 gram of $Sb_2O_5$+0.200 gram of NaF are mixed, calcined for half an hour at 800° C. and, after pulverising, for half an hour at 1000° C. A greenish yellow pigment having a rutile structure is obtained.

EXAMPLE 76

5.000 grams of anatase+0.250 gram of $Cr_2O_3$+0.250 gram of CuO (calculated from $CuCO_3$)+1.550 grams of $Sb_2O_5$ are mixed, calcined for half an hour at 800° C. and, after pulverising, for half an hour at 1000° C. A beige-coloured pigment having a rutile structure is obtained.

EXAMPLE 77

5.000 grams of anatase+0.250 gram of $Fe_2O_3$+0.250 gram of MnO (calculated from $MnCO_3$)+1.645 grams of $Sb_2O_5$ are mixed, calcined for half an hour at 800° C. and, after pulverising, for half an hour at 1000° C. A reddish-brown pigment having a rutile structure is obtained.

EXAMPLE 78

5.000 grams of anatase+0.200 gram of $Fe_2O_3$+0.156 gram of $Bi_2O_5$ (from nitrate)+0.303 gram of $Sb_2O_5$ are mixed, calcined for half an hour at 800° C. and, after pulverising, for half an hour at 1000° C. A yellow-beige pigment having a rutile structure is obtained.

EXAMPLE 79

5.000 grams of anatase+0.500 gram of CuO (calculated from $CuCO_3$)+1.015 grams of $Sb_2O_5$+0.835 gram of $Nb_2O_5$ are mixed, calcined for half an hour at 800° C. and, after pulverising, for half an hour at 1000° C. A light greenish yellow pigment having a rutile structure is obtained.

EXAMPLE 80

5.000 grams of anatase+0.500 gram of $Cr_2O_3$+0.268 gram of $Sb_2O_5$+1.091 grams of $Ta_2O_5$ are mixed, calcined for half an hour at 800° C. and, after pulverising for half an hour at 1000°. A greyish-olive pigment having a rutile structure is obtained.

EXAMPLE 81

Titanium hydroxide sludge ($TiO_2$ solid content 5.000 grams) is mixed with 0.500 gram of CuO (calculated from $CuCO_3$)+0.508 gram of $Sb_2O_5$+0.678 gram of $MoO_3$ and is calcined for half an hour at 700° C. and, after pulverising for a further half hour at 800° C. An olive-green pigment having a rutile structure is obtained.

EXAMPLE 82

5.000 grams of $TiO_2$+0.500 gram of MnO (calculated from $MnCO_3$)+1.140 grams of $Sb_2O_5$+1.010 grams of $UO_5$ (from uranyl nitrate) are mixed, calcined for half an hour at 800° C. and, after pulverising, for half an hour at 1000° C. A red-brown pigment of mixed rutile and trirutile structure is obtained.

EXAMPLE 83

5.000 grams of anatase+0.100 gram of MgO (calculated from $MgCO_3$)+0.100 gram of MnO (from $MnCO_3$)+0.010 gram of $Fe_2O_3$+0.010 gram of $Cr_2O_3$ are mixed with 0.452 gram of $V_2O_5$ (from $NH_4VO_3$)+0.456 gram of $Sb_2O_5$+0.0654 gram of $Bi_2O_5$ (from nitrate)+0.0179 gram of $UO_3$ (from nitrate)+0.0175 gram of $Nb_2O_5$, and the mixture is calcined for half an hour at 800° C. and, after pulverising, for a further half hour at 1000° C. A dark brown pigment having a rutile structure is obtained.

EXAMPLE 84

5.000 grams of anatase+0.500 gram of CoO (calculated from $CoCO_3$)+1.774 grams of $Nb_2O_5$ are mixed, calcined for half an hour at 800° C. and, after pulverising, for half an hour at 1000° C. A brownish-beige pigment having a rutile structure is obtained.

EXAMPLE 85

5.000 grams of anatase+0.500 gram of NiO (calculated from $NiCO_3$)+2.960 grams of $Ta_2O_5$+0.250 gram of NaF are mixed, calcined for half an hour at 800° C. and, after pulverising, for half an hour at 1000° C. A lemon-yellow pigment of predominantly rutile lattice, which is partly disturbed, is obtained.

EXAMPLE 86

5.000 grams of $TiO_2$ (calculated from hydrate sludge) are mixed with 0.500 gram of NiO (calculated from $NiCO_3$)+0.890 gram of $Nb_2O_5$+1.480 grams of $Ta_2O_5$ and calcined first for half an hour at 800° C. and then, after pulverising and the addition of 0.250 gram of NaF, for half an hour at 1000° C. A lemon-yellow pigment of predominantly rutile structure is obtained.

EXAMPLE 87

5.000 grams of anatase+0.500 gram of NiO (calculated from $NiCO_3$)+0.500 gram of CoO (calculated from $CoCO_3$)+1.774 grams of $Nb_2O_5$+2.960 grams of $Ta_2O_5$ are mixed, calcined for half an hour at 800° C., then after pulverising, for half an hour at 1000° C. and finally,

EXAMPLE 88

5.000 grams of $TiO_2$ (calculated from hydrate sludge) +0.500 gram of CoO (calculated from $CoCO_3$)+0.960 gram of $MoO_3$ are mixed, calcined for half an hour at 700° C. and, after pulverising, for half an hour at 800° C. A brown-grey pigment of quite predominantly anatase structure is obtained.

EXAMPLE 89

5.000 grams of $TiO_2$ (calculated from hydrate sludge) +0.500 gram of CoO (calculated from $CoCO_3$)+0.960 gram of $MoO_3$ are mixed, calcined for half an hour at 700° C. and, after pulverising and the addition of 0.200 gram of NaF, for a further half hour at 800° C. A dark brown pigment of rutile structure is obtained.

EXAMPLE 90

5.000 grams of anatase+0.200 gram of CoO (calculated from $CoCO_3$)+0.764 gram of $UO_3$ (calculated from uranyl nitrate) are mixed, calcined for half an hour at 800° C. and, after pulverising, for half an hour at 1000° C. A yellow-brown pigment of rutile structure is obtained.

EXAMPLE 91

5.000 grams of anatase+0.200 gram of NiO (calculated from $NiCO_3$)+0.385 gram of $MoO_3$ are mixed, calcined for half an hour at 600° C. and, after pulverising, for half an hour at 800° C. A brown-orange pigment of anatase structure is obtained.

EXAMPLE 92

5.000 grams of anatase+0.200 gram of NiO (calculated from $NiCO_3$)+0.776 gram of $UO_3$ (from nitrate) are mixed, calcined for half an hour at 800° C., and, after pulverising, for half an hour at 1000° C. An olive-yellow pigment of rutile structure is obtained.

EXAMPLE 93

5.000 grams of $TiO_2$ (calculated from hydrate sludge) +0.500 gram of CoO (calculated from $CoCO_3$)+0.737 gram of $Ta_2O_5$+0.720 gram of $MoO_3$+0.200 gram of NaF are mixed, calcined for half an hour at 700° C. and, after pulverising, for half an hour at 800° C. A dark brown pigment with a violet cast and which is of rutile structure is obtained.

EXAMPLE 94

5.000 grams of anatase+0.500 gram of NiO (calculated from $NiCO_3$)+0.890 gram of $Nb_2O_5$+0.958 gram of $UO_3$ (from nitrate) are mixed, calcined for half an hour at 800° C. and, after pulverising, for half an hour at 1000° C. A brownish yellow-olive pigment of rutile structure is obtained.

EXAMPLE 95

5.000 grams of $TiO_2$ (calculated from hydrate sludge) +0.250 gram of NiO (calculated from $NiCO_3$)+1.478 grams of $Ta_2O_5$+0.500 gram of ZnO (calculated from $ZnCO_3$)+1.632 grams of $Nb_2O_5$ are mixed, calcined for half an hour at 800° C. and then, after pulverising, for half an hour at 1000° C. and, finally, after further pulverising, for 2 hours at 1100° C. A yellow pigment with a greenish cast and a rutile structure is obtained.

EXAMPLE 96

5.000 grams of anatase+0.100 gram of $Li_2O$ (calculated from $Li_2CO_3$)+0.100 gram of ZnO (calculated from $ZnCO_3$)+0.100 gram of CoO (from $CoCO_3$)+0.100 gram of NiO (from $NiCO_3$)+0.100 gram of FeO (from $FeCO_3$)+0.100 gram of MnO (from $MnCO_3$)+0.100 gram of $Al_2O_3$+0.100 gram of $Cr_2O_3$+0.100 gram of $SnO_2$+0.100 gram of CuO (from $CuCO_3$)+0.711 gram of $Nb_2O_5$+1.761 grams of $Ta_2O_5$+1.446 grams of $MoO_3$+0.734 gram of $UO_3$ (from nitrate) are mixed, calcined for half an hour at 800° C. and, after pulverising, for half an hour at 100° C. A dark red-brown pigment of clearly rutile structure is obtained.

EXAMPLE 97

5.000 grams of anatase+0.500 gram of CoO (calculated from $CoCO_3$)+1.080 grams of $Sb_2O_5$+0.953 gram of $UO_3$ (calculated from uranyl nitrate) are mixed, calcined for half an hour at 800° C. and, after pulverising, for half an hour at 1000° C. A yellowish brown pigment of rutile structure is obtained.

EXAMPLE 98

5.000 grams of $TiO_2$ (calculated from hydrate sludge) +0.500 gram of NiO (calculated from $NiCO_3$)+1.080 grams of $Sb_2O_5$+0.482 gram of $MoO_3$+0.100 gram of NaF are mixed, calcined for half an hour at 700° C. and, after pulverising, for half an hour at 800° C. A light brown-yellow pigment of which approximately 40% has an anatase structure and approximately 60% a rutile structure is obtained.

EXAMPLE 99

5.000 grams of anatase+0.500 gram of NiO (calculated from $NiCO_3$)+1.080 grams of $Sb_2O_5$+1.665 grams of $Bi_2O_5$ (calculated from bismuth nitrate) are mixed, calcined for half an hour at 800° C. and, after pulverising, for half an hour at 1000° C. A light yellow pigment with a brownish cast and with a predominantly rutile and trirutile structure is obtained.

EXAMPLE 100

5.000 grams of anatase+0.500 gram of NiO (calculated from $NiCO_3$)+0.889 gram of $Nb_2O_5$+1.015 grams of $Sb_2O_5$ are mixed, calcined for half an hour at 800° C. and, after pulverising, for half an hour at 1000° C. A lemon-yellow pigment of rutile structure is obtained.

EXAMPLE 101

5.000 grams of anatase+0.250 gram of CoO (calculated from $CoCO_3$) are mixed with the quantities of oxidic compounds and with the quantities of $Sb_2O_5$ indicated in Table 1 and the mixtures are then calcined for half an hour at 800° C. and after pulverising, for half an hour at 1000° C. The coloured pigments listed with rutile or trirutile structures as listed are obtained.

Table 1

COMPOSITION OF THE MIXED PHASES OF $TiO_2$+0.25 GRAM OF CoO, COLOUR, AND X-RAY ANALYSIS

| No. | $x$ grams of low-valence oxide | $y$ grams of $Sb_2O_5$ | Colour | X-ray structure |
|---|---|---|---|---|
| a | 0.10 g. of $Li_2O$ | 4.328 | Brownish light orange-yellow. | Rutile structure. |
| b | 0.25 g. of MgO | 3.130 | Light-orange yellow. | Rutile-tri-rutile. |
| c | 0.25 g. of ZnO | 2.073 | Brownish yellow-orange. | Rutile-tri-rutile. |
| d | 0.25 g. of MnO | 2.221 | Yellowish brown | Do. |
| e | 0.25 g. of FeO | 2.206 | Pale brown-yellow. | Do. |
| f | 0.25 g. of $Al_2O_3$ | 1.873 | Yellow-orange | Rutile. |
| g | 0.25 g. of $Ga_2O_3$ | 1.511 | Brownish yellow-orange. | Do. |
| h | 0.25 g. of $Cr_2O_3$ | 1.615 | do | Do. |
| i | 0.25 g. of $Fe_2O_3$ | 1.585 | Dirty yellow-orange. | Do. |

EXAMPLE 102

5.000 grams of anatase+0.250 gram of NiO (calculated from $NiCO_3$) are mixed with the quantities of oxidic compounds and with the quantities of $Sb_2O_5$ indicated in Table 2 and the mixture then calcined for half an hour at 800° C. and, after pulverising, for half an hour at 1000° C. in each case a pigment with a rutile or trirutile structure as listed in the table is obtained.

Table 2

COMPOSITION OF THE MIXED PHASES OF $TiO_2$ WITH 0.25 GRAM OF NiO, COLOUR AND X-RAY ANALYSIS

| No. | $x$ grams of low-valence oxide | $y$ grams of $Sb_2O_5$ | Colour | X-ray structure |
|---|---|---|---|---|
| a | 0.10 g. of $Li_2O$ | 4.328 | Greenish-yellow | Rutile. |
| b | 0.25 g. of MgO | 3.130 | Greenish white-grey. | Rutile-tri-rutile badly crystallised. |
| c | 0.25 g. of ZnO | 2.073 | Light lemon-yellow. | Rutile. |
| d | 0.25 g. of MnO | 2.221 | Medium brown | Do. |
| e | 0.25 g. of FeO | 2.206 | Light olive-grey | Do. |
| f | 0.50 g. of CuO [1] | 4.190 | Yellow-green | Do. |
| g | 0.25 g. of $Al_2O_3$ | 1.873 | White-green-yellow. | Rutile tri-rutile. |
| h | 0.25 g. of $Ga_2O_3$ | 1.511 | Green-yellow | Rutile. |
| i | 0.25 g. of $Cr_2O_3$ | 1.615 | Brownish-yellow | Do. |
| k | 0.25 g. of $Fe_2O_3$ | 1.585 | Light olive-grey | Do. |

[1] Here combined with 0.50 g. of NiO.

EXAMPLE 103

5.000 grams of anatase+0.500 gram of NiO+1.082 grams of $Sb_2O_5$+0.890 gram of $Nb_2O_5$+1.000 gram of $ZrO_2$ (calculated from nitrate) are mixed, calcined for half an hour at 800° C., and, after pulverising, for half an hour at 1000° C. A lemon-yellow pigment of predominantly rutile structure is obtained.

EXAMPLE 104

5.000 grams of anatase+0.100 gram of MgO (calculated from $MgCO_3$)+0.100 gram of MnO (calculated from $MnCO_3$)+0.100 gram of CoO (calculated from $CoCO_3$)+0.200 gram of NiO (calculated from $NiCO_3$)+0.100 gram of $Fe_2O_3$+0.100 gram of $Cr_2O_3$+0.010 gram of $Ga_2O_3$ are mixed with 2.108 grams of $Sb_2O_5$+0.389 gram of $Nb_2O_5$+0.589 gram of $Ta_2O_5$, and the mixture is then calcined for half an hour at 800° C. and, after pulverising, for a further half hour at 1000° C. A light yellow-brown pigment having a rutile structure is obtained.

EXAMPLE 105

5.000 grams of $TiO_2$ (hydrate sludge)+0.200 gram of CoO (calculated from $CoCO_3$)+0.612 gram of $As_2O_5$ (calculated from $H_3AsO_4$) are mixed, calcined for half an hour at 700° C., and, after pulverising, for half an hour at 800° C. A violet grey pigment with an anatase lattice is obtained.

EXAMPLE 106

5.000 grams of $TiO_2$ (hydrate sludge)+0.200 gram of NiO (calculated from $NiCO_3$)+0.616 gram of $As_2O_5$ (from $H_3AsO_4$) are mixed, calcined for half an hour at 700° C., and after pulverising, for half an hour at 800° C. A greenish yellow pigment having an anatase structure is obtained.

EXAMPLE 107

5.000 grams of $TiO_2$(hydrate sludge)+0.200 gram of CuO (calculated from $CuCO_3$)+0.577 gram of $As_2O_5$ (calculated from $H_3AsO_4$) are mixed, calcined for half an hour at 700° C., and, after pulverising, for half an hour at 800° C. A white-grey pigment having an anatase structure is obtained.

EXAMPLE 108

5.000 grams of $TiO_2$ (hydrate sludge)+1.000 gram of CuO (calculated from $CuCO_3$)+0.500 gram of ZnO (calculated from $ZnCO_3$)+0.430 gram of $As_2O_5$ (calculated from $H_3AsO_4$)+2.426 grams of $MoO_3$ are mixed, calcined for half an hour at 700° C., and, after pulverising, for half an hour at 800° C. A green grey sandy pigment of quite predominantly rutile structure is obtained.

EXAMPLE 109

5.000 grams anatase and 0.200 gram of $ZnF_2$ are mixed, calcined for half an hour at 800° C. and for half an hour at 1000° C. A yellowish white pigment with the crystal structure of rutile is obtained.

EXAMPLE 110

5.000 grams of anatase are mixed with 0.500 gram of $MnF_2$, calcined for half an hour at 800° C. and for half an hour at 1000° C. A dark violet-brown pigment with a rutile structure is obtained.

EXAMPLE 111

5.000 grams of anatase are mixed with 0.500 gram of $CoF_2$, calcined for half an hour at 800° C. and, after being pulverised, for half an hour at 1000° C. A reddish-brown pigment which is shown by X-ray analysis to have a rutile structure is obtained.

EXAMPLE 112

5.000 grams of anatase and 0.500 gram of $NiF_2$ are mixed, calcined for half an hour at 800° C. and, after being pulverised, for half an hour at 1000° C. A bright lemon yellow pigment of rutile structure is obtained.

EXAMPLE 113

5.000 grams of anatase, 0.500 gram of $NiF_2$ and 0.100 gram of NaF are mixed together, calcined for half an hour at 800° C. and, after being pulverised, for half an hour at 1000° C. A canary yellow pigment which is shown by X-ray examination to have a rutile structure is obtained.

EXAMPLE 114

5.000 grams of anatase, 0.500 gram of $CrF_3$ (calculated from $CrF_3.3H_2O$) and 0.119 gram of LiF are mixed together, calcined for half an hour at 800° C. and, after pulverisation, for half an hour at 1000° C. A dark brown pigment of rutile structure is obtained.

EXAMPLE 115

5.000 grams of anatase, 0.200 gram of $FeF_3$ (calculated from $FeF_3.3H_2O$) and 0.018 gram of $Li_2O$ (calculated from $Li_2CO_2$) are mixed together, calcined for half an hour at 800° C., and, after further pulverisation, for half an hour at 1000° C. A light beige pigment of rutile structure is obtained.

EXAMPLE 116

5.000 grams of anatase, 0.050 gram of $AlF_3$ (calculated from $AlF_3.3H_2O$) 0.500 gram of $CrF_3$ (calculated from $CrF_3.3H_2O$), 0.500 gram of $FeF_3$ (calculated from $FeF_3.3H_2O$) and 0.148 gram of $Li_2O$ (calculated from $Li_2CO_3$) are mixed together, calcined for half an hour at 800° C. and, after pulverisation, for half an hour at 1000° C. A dark brown pigment with a reddish tinge and having a rutile structure is obtained.

EXAMPLE 117

5.000 grams of anatase, 0.500 gram of $AlF_3$ (calculated from $AlF_3.3H_2O$) and 0.484 gram of ZnO (calculated from $ZnCO_3$) are mixed, calcined for half an hour at 800° C. and, after pulverisation, for half an hour at 1000° C. A yellowish white pigment of rutile structure is obtained.

EXAMPLE 118

5.000 grams of anatase, 0.500 gram of $AlF_3$ (calculated from $AlF_3.3H_2O$) and 0.422 gram of MnO (calculated from $MnCO_3$) are mixed, calcined for half an hour at 800° C., and for a further half hour at 1000° C., after pulverisation. A dark violet-brown pigment of rutile structure is obtained.

EXAMPLE 119

5.000 grams of anatase, 0.500 gram of $AlF_3$ (calculated from $AlF_3.3H_2O$) and 0.445 gram of NiO (calculated from $NiCO_3$) are mixed, calcined for half an hour at 800° C., and for another half an hour at 1000° C. after pulverisation. A pastel-coloured lime-green pigment which has the crystal structure of rutile is obtained.

EXAMPLE 120

5.000 grams of anatase, 0.500 gram of $CrF_3$ (calculated from $CrF_3.3H_2O$) and 0.329 gram of FeO (calculated from $FeCO_3$) are mixed together, calcined for half an hour at 800° C. and then for another half hour at 1000° C. after pulverisation. A dark olive brown pigment of rutile structure is obtained.

EXAMPLE 121

5.000 grams of anatase, 0.500 gram of $FeF_3$ (calculated from $FeF_3.3H_2O$) and 0.314 gram of MnO (calculated from $MnCO_3$) are mixed together, heated for half an hour at 800° C. and, after being further pulverised, for half an hour at 1000° C. A dark brown pigment with a violet tinge and having a rutile structure is obtained.

EXAMPLE 122

5.000 grams of anatase, 0.100 gram of $AlF_3$ (calculated from $AlF_3.3H_2O$) and 0.089 gram of NiO (calculated from $NiCO_3$) are mixed together, calcined for half an hour at 800° C., pulverised, and then calcined for another half hour at 1000° C. A yellowish-grey pigment substantially 85% of which has a rutile structure and substantially 15% an anatase structure, was obtained.

EXAMPLE 123

5.000 grams of anatase, 0.500 gram $CrF_3$ (calculated from $CrF_3.3H_2O$) and 0.697 gram $Cr_2O_3$ ar emixed together, calcined for half an hour at 800° C., pulverised, and then calcined for another half hour at 1000° C. A dark olive-coloured pigment of rutile structure is obtained.

EXAMPLE 124

5.000 grams of anatase, 0.500 gram of $Sb_2O_5$ and 0.040 gram of LiF are mixed together, calcined for half an hour at 800° C., and then for another half hour at 1000° C. after pulverisation. A yellowish-white pigment of rutile structure is obtained.

EXAMPLE 125

5.000 grams of anatase, 0.2000 gram $V_2O_5$ (calculated from $NH_4VO_3$) and 0.029 gram of LiF are mixed together, calcined for half an hour at 800° C., pulverised, and then calcined for another half hour at 1000° C. A dark-brown pigment of rutile structure is obtained.

EXAMPLE 126

5.000 grams of anatase, 0.100 gram of $Nb_2O_5$ and 0.009 gram of LiF are mixed together, calcined for half an hour at 800° C. and for a further half hour at 1000° C. after pulverisation. A whitish-yellow pigment about 70% which has an anatase structure and about 30% a rutile structure is obtained.

EXAMPLE 127

5.000 grams of anatase, 0.500 gram of $Ta_2O_5$ and 0.029 gram of LiF are mixed together, calcined for half an hour at 800° C., and for another half hour at 1000° C. after pulverisation. A whitish-yellow pigment of rutile structure is obtained.

EXAMPLE 128

5.000 grams of $TiO_2$ (calculated from titanium hydroxide), 0.500 gram of MoO and 0.090 gram of LiF are mixed together, calcined for half an hour at 600° C. and, after being pulverised, for another hour at 800° C. A dark grey pigment which has the structure of rutile is obtained.

EXAMPLE 129

5.000 grams of anatase, 0.500 gram of $WO_3$ (calculated from $H_2WO_4$) and 0.056 gram of LiF are mixed, calcined for half an hour at 800° C. and for another half an hour at 1000° C. after pulverisation. A yellowish-whitish grey pigment which a rutile structure is obtained.

EXAMPLE 130

5.000 grams of rutile, 0.500 gram of $WO_3$ (calculated from $H_2WO_4$) and 0.056 gram of LiF are mixed together, calcined for half an hour at 800° C. and for another half an hour at 1000° C. after being pulverised. A yellowish-whitish grey pigment of rutile structure is obtained.

EXAMPLE 131

A mixture of 5.000 grams of anatase and the components indicated in the accompanying table by $x$ g. $X+Y$ g. $Y+z$ g. $Z$ is calcined for half an hour at 800° C. and for another half hour at 1000° C., after being pulverised. Pigments which have the colour and the crystal structure set out in the table are obtained. It is to be seen from the table that the systems mentioned in the earlier examples also form solid solutions with one another while maintaining the rutile structure.

Table.—Examples for No. 131

| No. | $x$ g. X | $y$ g. Y | $z$ g. Z | Colour of pigments | Crystal structure |
|---|---|---|---|---|---|
| a | 0.200 g. $CuF_2$ | | 0.200 g. $NiF_2$ | Olive brown | Rutile. |
| b | 0.200 g. $CoF_2$ | | do | Greenish brown | Do. |
| c | 0.200 g. $MgF_2$ | | do | Canary yellow | Do. |
| d | 0.200 g. $ZnF_2$ | 0.200 g. $CuF_2$ | do | Bright yellow green | Do. |
| e | 0.200 g. $MnF_2$ | | do | Rich dark reddish brown | Do. |
| f | 0.200 g. $AlF_3$ | 0.062 g. LiF | do | Greenish yellow | Do. |
| g | 0.200 g. $CrF_3$ | 0.047 g. LiF | 0.200 g. $CoF_2$ | Reddish brown | Do. |
| h | 0.200 g. $AlF_3$ | 0.243 g. $Al_2O_3$ | 0.200 g. $NiF_2$ | Light green | Do. |
| i | 0.200 g. $MnF_2$ | | 0.200 g. $CoF_2$ | Rich dark reddish brown | Do. |
| k | 0.045 g. LiF | 0.200 g. $V_2O_5$ | 0.200 g. $Sb_2O_5$ | Khaki | Do. |
| l | 0.038 g. LiF | 0.200 g. $WO_3$ | do | White with slight yellowish tinge | Do. |
| m | 0.034 g. LiF | 0.200 g. $UO_3$ | do | Orange yellow | Do. |
| n | 0.040 g. LiF | do | 0.200 g. $WO_3$ | Light grey | Do. |
| o | 0.033 g. LiF | 0.200 g. $WO_3$ | 0.200 g. $Bi_2O_5$ | Whitish yellow | Do. |
| p | 0.200 g. $CrF_3$ | 0.200 g. $AlF_3$ | 0.110 g. LiF | Reddish-tinged brown | Do. |
| q | 0.200 g. $CrF_3$+0.279 g. $Cr_2O_3$ | 0.200 g. $AlF_3$+0.243 g. $Al_2O_3$ | 0.100 g. $NiF_2$ | Grey brown | Do. |
| r | 0.200 g. $MnF_2$ | 0.200 g. $AlF_3$ | 0.062 g. LiF | Dark reddish brown | Do. |

EXAMPLE 132

5.00 grams of $SnO_2$, 0.020 gram of $Li_2O$($Li_2CO_3$) and 0.650 gram of $Sb_2O_5$ are mixed together, calcined for half an hour at 800° C. for another half an hour at 1000° C. after pulverisation and finally for another half an hour at 1150° C. after further pulverisation. A light-blue pigment of rutile structure is obtained.

EXAMPLE 133

5.00 grams of $SnO_2$, 0.100 gram of MgO($MgCO_3$) and 0.802 gram of $Sb_2O_5$ are mixed together; the mixture is calcined for half an hour at 1000° C., for half an hour at 1150° C. after pulverisation and for another half an hour at 1350° C. after further pulverisation. A greyish-blue pigment with a greenish tinge and a rutile structure is obtained.

EXAMPLE 134

5.000 grams of $SnO_2$, 0.200 gram of ZnO($ZnCO_3$) and 0.759 gram of $Sb_2O_5$ are mixed together, calcined for half an hour at 1000° C., and for another half an hour at 1150° C. after pulverisation. A whitish-blue pigment with a greenish tinge and a rutile structure is obtained.

EXAMPLE 135

5.000 grams of $SnO_2$, 0.200 gram of $MnO(MnCO_3)$ and 0.912 gram of $Sb_2O_5$ are mixed together; the mixture calcined for half an hour at 800° C., pulverised, further calcined for half an hour at 1000° C., and then again pulverised and further calcined for half an hour at 1150° C. A light greyish-brown pigment with a rutile structure is obtained.

EXAMPLE 136

5.000 grams of $SnO_2$, 0.200 gram of $FeO(FeCO_3)$ and 0.900 gram of $Sb_2O_5$ are mixed together; the mixture is calcined for half an hour at 80° C., for another half an hour at 1000° C. after pulverisation and then, after being pulverised again for a further half hour at 1150° C. A light grey pigment with a rutile structure is obtained.

EXAMPLE 137

5.000 grams of $SnO_2$, 0.200 gram of $CoO(CoCO_3)$ and 0.864 gram of $Sb_2O_5$ are mixed together; the mixture is calcined for half an hour at 800° C., pulverised, calcined for a further half an hour at 1000° C., and again pulverised, and finally calcined for another half an hour at 1150° C. A yellowish-grey pigment with a brown tinge and a rutile structure is obtained.

EXAMPLE 138

5.000 grams of $SnO_2$, 0.200 gram of $NiO(NiCO_3)$ and 0.866 gram of $Sb_2O_5$ are mixed together; the mixture is calcined for half an hour at 800° C., pulverised, calcined for a further half an hour at 1000° C., again pulverised, calcined for another half an hour at 1150° C. and, after being pulverised again, calcined for another half hour at 1350° C. An olive-green pigment with a rutile structure is obtained, both at 1000° C. and at 1350° C.

EXAMPLE 139

5.000 grams of $SnO_2$, 0.500 gram of $CuO(CuCO_3)$ and 2.033 grams of $Sb_2O_5$ are mixed together; the mixture is heated for half an hour at 800° C., pulverised, and heated again for half an hour at 1000° C., and then pulverised and heated for another half an hour at 1150° C. A brownish-olive coloured pigment with a rutile structure is obtained.

EXAMPLE 140

5.000 grams of $SnO_2$, 0.200 gram of $Al_2O_3$ (from $Al(OH)_3$) and 0.634 gram of $Sb_2O_5$ are mixed together; the mixture is heated for half an hour at 800° C., pulverised, heated for half an hour at 1000° C., pulverised again, heated for half an hour at 1150° C., pulverised yet again, and heated for one hour at 1350° C. A light dove-blue coloured pigment with a rutile structure is obtained.

EXAMPLE 141

5.000 grams of $SnO_2$, 0.500 gram of $Ga_2O_3$ and 0.863 gram of $Sb_2O_5$ are mixed together; the mixture is heated for half an hour at 800° C., pulverised, heated for half an hour at 1000° C., again pulverised, and heated for half an hour at 1150° C., and finally pulverised yet again and then heated for half an hour at 1350° C. A light greyish-blue pigment with a rutile structure is obtained.

EXAMPLE 142

5.000 grams of $SnO_2$, 0.500 gram of $Cr_2O_3$ and 1.065 grams of $Sb_2O_5$ are mixed together; the mixture is heated for half an hour at 800° C., pulverised, heated for half an hour at 1000° C., pulverised again, heated for half an hour at 1150° C., and finally pulverised yet again and then heated for 1 hour at 1350° C. A yellowish-brown pigment with a rutile structure is obtained.

EXAMPLE 143

5.000 grams of $SnO_2$, 0.50 gram of $Mn_2O_3(MnCO_3)$ and 1.025 grams of $Sb_2O_5$ are mixed together, heated for half an hour at 800° C., pulverised, heated for half an hour at 1000° C., pulverised again and then heated for half an hour at 1150° C. A greyish-brown pigment of predominantly rutile structure is obtained.

EXAMPLE 144

5.000 grams of $SnO_2$, 0.500 gram of $Fe_2O_3$ and 1.013 grams of $Sb_2O_5$ are mixed together; the mixture is heated for half an hour at 800° C., pulverised, heated for half an hour at 1000° C., pulverised again, heated for a further half hour at 1150° C., and finally pulverised once more and heated for one hour at 1350° C. A light greyish-yellow pigment with a rutile structure is obtained.

EXAMPLE 145

5.000 grams of $SnO_2$, 0.050 gram of $Li_2O(Li_2CO_3)$ and 0.913 gram of $V_2O_5$ are mixed together; the mixture is heated for half an hour at 1000° C., pulverised, and then heated for half an hour at 1150° C. A blackish-reddish brown pigment with a rutile structure is obtained.

EXAMPLE 146

5.000 grams of $SnO_2$, 0.200 gram of $MgO(MgCO_3)$ and 0.903 gram of $V_2O_5$ are mixed together, heated for half an hour at 1000° C., pulverised, and then heated for half an hour at 1150° C. An olive-brown pigment with a rutile structure is obtained.

EXAMPLE 147

5.000 grams of $SnO_2$, 0.500 gram of $ZnO_2$ ($ZnCO_3$) and 1.118 grams of $V_2O_5$ are mixed together; the mixture is heated for half an hour at 1000° C., pulverised, and heated for a further half hour at 1150° C. An olive-coloured pigment with a yellowish tinge is obtained, the pigment having a rutile structure.

EXAMPLE 148

5.000 grams of $SnO_2$, 0.500 gram of $Al_2O_3$ ($Al(OH)_3$) and 0.892 gram of $V_2O_5$ are mixed together; the mixture is heated for half an hour at 1000° C., pulverised, heated for a further half hour at 1000° C., and, after being pulverised again, is heated for another half an hour at 1150° C. A brownish-yellow olive pigment with a rutile structure is obtained.

EXAMPLE 149

5.000 grams of $SnO_2$, 0.500 gram of $Al_2O_3(Al(OH)_3)$ and 1.304 grams of $Nb_2O_5$ are mixed together; the mixture is heated for half an hour at 1000° C., pulverised, heated for half an hour at 1150° C., and, after further pulverisation, heated for one hour at 1350° C. A white pigment with a rutile structure is obtained, both at 1150° C. and at 1350° C.

EXAMPLE 150

5.000 grams of $SnO_2$, 0.200 gram of $Al_2O_3(Al(OH)_3)$ and 0.866 gram of $Ta_2O_5$ are mixed together, heated for half an hour at 1000° C., pulverised, heated for half an hour at 1150° C., again pulverised and then heated for one hour at 1350° C. A greyish-white pigment with a rutile structure is obtained both at 1150° C. and at 1350° C.

EXAMPLE 151

5.000 grams of $SnO_2$, 0.200 gram of $MnO(MnCO_3)$, 0.654 gram of $WO_3$ and 0.200 gram of MaF are mixed together, heated for half an hour at 1000° C. and, after pulverisation for half an hour at 1150° C. A light grey pigment with a rutile structure is obtained.

EXAMPLE 152

5.000 grams of $SnO_2$, 0.200 gram of $FeO(FeCO_3)$ and 0.646 gram of $WO_3$ are mixed together; the mixture is heated for half an hour at 1000° C., pulverised, heated for half an hour at 1150° C. and finally pulverised again and then heated for one hour at 1350° C. A greyish pigment with a brownish tinge and a rutile structure is obtained both at 1150° C. and at 1350° C.

EXAMPLE 153

5.000 grams of $SnO_2$, 0.200 gram of $CoO$ ($CoCO_3$), 0.618 gram of $WO_3$ and 0.200 gram of NaF are mixed together, heated for half an hour at 1000° C., pulverised, and then heated for another half hour at 1150° C. A greyish blue pigment with a greenish tinge and a rutile structure is obtained.

EXAMPLE 154

5.000 grams of $SnO_2$, 0.200 gram of NiO ($NiCO_3$) and 0.620 gram of $WO_3$ are mixed together, heated for half an hour at 1000° C., pulverised, heated for half an hour at 1150° C., and then pulverised again and heated for 1 hour at 1350° C. A yellowish-grey pigment with a rutile structure is obtained, both at 1150° C. and at 1350° C.

EXAMPLE 155

5.000 grams of $SnO_2$, 0.500 gram of $Cr_2O_3$ and 0.763 gram of $WO_3$ are mixed together; the mixture is heated for half an hour at 1000° C., pulverised, heated for half an hour at 1150° C. and finally pulverised and heated again, for one hour at 1350° C. A grey pigment with a rutile structure is obtained, both at 1150° C. and at 1350° C.

EXAMPLE 156

5.000 grams of $SnO_2$, 0.500 gram of $Fe_2O_3$ and 0.726 gram of $WO_3$ are mixed together, heated for half an hour at 1000° C., pulverised, heated for half an hour at 1150° C., and finally pulverised again and re-heated for one hour at 1350° C. A dark grey pigment with a rutile structure is obtained, both at 1150° C. and at 1350° C.

EXAMPLE 157

5.000 grams of $SnO_2$, 0.050 gram of $Li_2O$ ($Li_2CO_3$) and 1.436 grams of $UO_3$ (calculated from uranyl nitrate) are mixed together, heated for half an hour at 1000° C., pulverised and then heated for half an hour at 1150° C. A grey pigment with a greenish tinge and a rutile structure is obtained.

EXAMPLE 158

5.000 grams of $SnO_2$, 0.100 gram of LiF and 0.701 gram of $V_2O_5$ are mixed together; the mixture is heated for half an hour at 1000° C., pulverised, and then heated for half an hour at 1150° C. A reddish dark brown pigment with a rutile structure is obtained.

EXAMPLE 159

5.000 grams of $SnO_2$ and 1.000 gram of $ZnF_2$ are mixed together; the mixture is heated for half an hour at 800° C., pulverised, and then heated for half an hour at 1000° C. A whitish-grey pigment with a disturbed rutile structure is obtained.

EXAMPLE 160

5.000 grams of $SnO_2$ and 1.000 gram of $CoF_2$ are mixed together, heated for half an hour at 1000° C., and after being pulverised, for another half hour at 1150° C. A dark greenish-blue pigment of somewhat disturbed rutile structure is obtained.

EXAMPLE 161

5.000 grams of $SnO_2$ and 1.000 gram of $MnF_2$ are mixed together, heated for half an hour at 800° C. and, after being pulverised, for another half hour at 1000° C. A greyish-brown pigment of rutile structure is obtained.

EXAMPLE 162

5.000 grams of $SnO_2$ and 2.000 grams of $NiF_2$ are mixed together, heated for half an hour at 1000° C. and, after being pulverised, for another half an hour at 1150° C. A greyish-yellow pigment of a rutile structure or rutile over structure is obtained.

EXAMPLE 163

5.000 grams of $SnO_2$ and 2.000 grams of $CuF_2$ are mixed together, heated for half an hour at 1000° C. and, after being pulverised, for half an hour at 1150° C. in air. A greyish-brown pigment with a violet tinge and a rutile structure is obtained.

EXAMPLE 164

5.000 grams of $SnO_2$, 0.476 gram of LiF and 2.000 grams of $CrF_3$ are mixed, heated for half an hour at 1000° C., pulverised, and heated for another half hour at 1150° C. A violet-red pigment of a rutile structure or rutile over structure is obtained.

EXAMPLE 165

5.000 grams of $SnO_2$, 0.460 gram of LiF and 2.000 grams of $FeF_3$ are mixed; the mixture is heated for half an hour at 1000° C. and, after pulverisation, for half an hour at 1150° C. A medium grey pigment with a rutile structure is obtained.

EXAMPLE 166

5.000 grams of $SnO_2$, 0.1765 gram of $Li_2O$ (from $Li_2CO_3$) and 2.000 grams of $FeF_3$ are mixed together, heated for half an hour at 1000° C., pulverised, and then heated for another half hour at 1150° C. A grey pigment with a slight greenish tinge and a rutile structure is obtained.

EXAMPLE 167

5.000 grams of $SnO_2$, 0.0913 gram of $Li_2O$ (from $Li_2CO_3$) and 1.000 gram of $CrF_3$ are mixed, heated for half an hour at 1000° C., pulverised, and then heated for half an hour at 1150° C. A violet-red pigment which has a rutile structure is obtained.

EXAMPLE 168

5.000 grams of $SnO_2$, 2.000 grams of $FeF_3$ and 1.410 grams of CuO (from $CuCO_3$) are mixed; the mixture is heated for half an hour at 1000° C., and heated again, after pulverisation, for half an hour at 1150° C. A blackish-grey pigment with a rutile structure is obtained.

EXAMPLE 169

5.000 grams of $SnO_2$, 0.224 gram of LiF and 2.000 grams of $WO_3$ are mixed together; the mixture is heated for half an hour at 1000° C. and, after pulverising, for half an hour at 1150° C. A greyish-blue pigment with a greenish tinge and a rutile structure is obtained.

EXAMPLE 170

5.000 grams of $SnO_2$, 0.0907 gram of LiF and 1.000 gram of $UO_3$ (from uranyl nitrate) are mixed together and heated for half an hour at 1000° C. and, after pulverisation for half an hour at 1150° C. A greyish-beige pigment with a rutile structure is obtained.

EXAMPLE 171

5.000 grams of $SnO_2$, 0.411 gram of $Cu_2O$ and 2.000 grams of $WO_3$ are mixed together and heated in a stream of pure nitrogen for half an hour at 800° C., pulverised, and then heated for another half hour at 1000° C. A dark grey pigment with a rutile structure is obtained.

EXAMPLE 172

5.000 grams of $SnO_2$, 0.359 gram of $Cu_2O$ and 2.000 grams of $Nb_2O_5$ are mixed and heated in a stream of pure nitrogen for half an hour at 800° C., pulverised, and then heated for half an hour at 1000° C. A rich brownish-orange pigment with a rutile structure is obtained.

EXAMPLE 173

5.000 grams of $SnO_2$, 0.500 gram of ZnO (from $ZnCO_3$) and 1.412 grams of $As_2O_5$ are mixed, heated for half an hour at 900° C., pulverised, and then heated for half an hour at 1000° C. A yellowish white pigment with a rutile structure is obtained.

EXAMPLE 174

5.000 grams of $SnO_2$, 0.500 gram of NiO (from $NiCO_3$) and 1.5375 grams of $As_2O_5$ are mixed together, heated for half an hour at 900° C., pulverised, and then heated for one hour at 1000° C. A light greenish yellow pigment of somewhat disturbed rutile structure is obtained.

EXAMPLE 175

5.000 grams of $SnO_2$, 0.500 gram of CoO (from $CoCO_3$) and 1.533 grams of $As_2O_5$ are mixed together, heated for half an hour at 900° C., pulverised and then heated for another half hour at 1000° C. A violet pigment with a rutile structure is obtained.

EXAMPLE 176

5.000 grams of $SnO_2$, 0.200 gram of MnO (from $MnCO_3$) and 0.648 gram of $As_2O_5$ are mixed together, heated for half an hour at 900° C., pulverised, and then heated for half an hour at 1000° C. A greyish brown pigment with a yellowish tinge and a rutile structure is obtained.

EXAMPLE 177

5.000 grams of $SnO_2$, 0.500 gram of CuO (from $CuCO_3$) and 1.444 grams of $As_2O_5$ are mixed together, heated for half an hour at 900° C., pulverised, and then heated for another half hour at 1000° C. A bluish-green pigment with a rutile structure is obtained.

EXAMPLE 178

5.000 grams of $SnO_2$, 1.000 gram of $Fe_2O_3$ and 1.439 grams of $As_2O_5$ are mixed together, heated for half an hour at 900° C., pulverised, and then heated for another half hour at 1000° C. A blackish-grey pigment with a rutile structure is obtained.

EXAMPLE 179

5.000 grams of $SnO_2$, 0.500 gram of $Cr_2O_3$ and 0.756 gram of $As_2O_5$ are mixed together, heated for half an hour at 900° C., pulverised, and then heated for another half hour at 1000° C. A greenish-grey pigment with a rutile structure is obtained.

EXAMPLE 180

0.050 gram of $Li_2O$ (calculated from $Li_2CO_3$) and 1.624 grams of $Sb_2O_5$ are mixed together, heated for half an hour at 800° C., pulverised, and then heated for half an hour at 1000° C. A greenish-white pigment with a rutile or trirutile structure, $LiSb_3O_8$, is obtained.

EXAMPLE 181

0.500 gram of $V_2O_5$ (calculated from $NH_4VO_3$) and 0.889 gram of $Sb_2O_5$ are mixed together, heated for half an hour at 800° C., pulverised, and then heated for half an hour at 1000° C. A blackish-grey substance with a trirutile structure, $VSbO_4$, is obtained.

EXAMPLE 182

1.000 gram of $Al_2O_3$ (calculated from $Al(OH)_3$— Merck) and 3.174 grams of $Sb_2O_5$ are mixed—see the table below—with $x$ g. $X+y$ g. $Sb_2O_5$, heated for half an hour at 800° C., pulverised, and then heated for half an hour at 1000° C. Coloured pigments with a trirutile structure as described in the table are obtained.

| No. | $x$ g. X | $y$ g. $Sb_2O_5$ | Colour | Added compound | X-ray structure |
|---|---|---|---|---|---|
| b | 0.50 g. MgO | 4.010 | Greenish white. | $MgSb_2O_6$ | Trirutile. |
| c | 0.50 g. ZnO | 1.987 | do. | $ZnSb_2O_6$ | Do. |
| d | 0.50 g. FeO | 2.252 | Light grey with yellow tinge (1,100° C.). | $FeSb_2O_6$ | Trirutile disturbed. |
| e | 0.50 g. CoO | 2.160 | Light beige with greyish tinge. | $CoSb_2O_6$ | Trirutile. |
| f | 0.50 g. NiO | 2.160 | Light green (1,100° C.). | $NiSb_2O_6$ | Do. |
| g | 0.50 g. CuO | 2.030 | Whitish green. | $CuSb_2O_6$ | Trirutile disturbed. |
| h | 0.50 g. $V_2O_5$ | 0.889 | Reddish brown. | $VsbO_4$ | Trirutile or rutile disturbed. |
| k | 0.50 g. $Cr_2O_3$ | 1.070 | Greyish green (1,100° C.). | $CrSbO_4$ | Do. |

EXAMPLE 183

0.500 gram of $Ga_2O_3$ and 0.863 gram of $Sb_2O_5$ are mixed with $x$ g. $X+y$ g. $Sb_2O_5$, heated for half an hour at 800° C., pulverised, and then heated for half an hour at 1000° C. Coloured pigments with a trirutile structure as indicated in the following table are obtained.

| No. | $x$ g. X | $y$ g. $Sb_2O_5$ | Colour | Added compound | X-ray structure |
|---|---|---|---|---|---|
| a | 0.05 g. $Li_2O$ | 1.624 | Whitish grey. | $LiSb_3O_8$ | Trirutile. |
| b | 0.50 g. MgO | 4.010 | Very light grey. | $MgSb_2O_6$ | Do. |
| c | 0.50 g. ZnO | 1.987 | Bluish-tinged light grey. | $ZnSb_2O_6$ | Do. |
| d | 0.50 g. FeO | 2.252 | Light greyish brown. | $FeSb_2O_6$ | Trirutile poor. |
| e | 0.50 g. CoO | 2.160 | Beige. | $CoSb_2O_6$ | Trirutile. |
| f | 0.50 g. NiO | 2.160 | Greyish-tinged green (1,100° C.). | $NiSb_2O_6$ | Trirutile or rutile. |
| g | 0.50 g. CuO | 2.030 | Light lime green. | $CuSb_2O_6$ | Trirutile. |
| h | 0.50 g. $V_2O_5$ | 0.889 | Olive brown. | $VSbO_4$ | Do. |

EXAMPLE 184

0.500 gram of $V_2O_5$ and 0.889 gram of $Sb_2O_5$ are mixed with $x$ g. $X+y$ g. $Sb_2O_5$—see the table below—heated for half an hour at 800° C., pulverised, and then heated for half an hour at 1000° C. Pigments as described in the following table, and having the structure indicated therein, are obtained.

| No. | $x$ g. X | $y$ g. $Sb_2O_5$ | Colour | Added compound | X-ray structure |
|---|---|---|---|---|---|
| a | 0.05 g. $Li_2O$ | 1.624 | Darkish olive brown. | $LiSb_3O_8$ | Trirutile. |
| b | 0.50 g. MgO | 4.010 | Medium brown. | $MgSb_2O_6$ | Do. |
| c | 0.50 g. ZnO | 1.987 | Dark brownish olive. | $ZnSb_2O_6$ | Do. |
| d | 0.50 g. FeO | 2.252 | Dark olive green. | $FeSb_2O_6$ | Do. |
| e | 0.50 g. CoO | 2.160 | Olive-tinged dark brown. | $CoCb_2O_6$ | Do. |
| f | 0.50 g. NiO | 2.160 | Medium olive brown. | $NiSb_2O_6$ | Do. |
| g | 0.50 g. CuO | 2.030 | Darkish olive brown. | $CuSb_2O_6$ | Do. |

EXAMPLE 185

1.000 gram of $Cr_2O_3$ and 2.140 grams of $Sb_2O_5$ are mixed with $x$ g. $X+y$ g. $Sb_2O_5$, heated for half an hour at 800° C., pulverised, and then heated for another half hour at 1000° C., with results as shown in the following table:

| No. | x g. X | y g. $Sb_2O_5$ | Colour | Added compound | X-ray structure |
|---|---|---|---|---|---|
| a | 0.05 g. $Li_2O$ | 1.624 | Greyish tinged green. | $LiSb_3O_8$ | Trirutile not well crystallised. |
| b | 0.50 g. MgO | 4.010 | Medium grey | $MgSb_2O_6$ | Do. |
| c | 0.50 g. ZnO | 1.987 | Greyish tinged green. | $ZnSb_2O_6$ | Do. |
| d | 0.50 g. FeO | 2.252 | Greenish tinged grey. | $FeSb_2O_6$ | Do. |
| e | 0.50 g. CoO | 2.160 | Greyish green | $CoSb_2O_6$ | Do. |
| f | 0.50 g. NiO | 2.160 | Medium greenish grey. | $NiSb_2O_6$ | Do. |
| g | 0.50 g. CuO | 2.030 | Light green | $CuSb_2O_6$ | Do. |
| h | 0.50 g. $Ga_2O_3$ | 0.863 | Greyish green | $GaSbO_4$ | Do. |
| i | 0.50 g. $V_2O_5$ | 0.889 | Darkish olive | $VSbO_4$ | Do. |

EXAMPLE 186

1.000 gram of $Fe_2O_3$, 2.020 grams of $Sb_2O_5$, x g. X and y g. $Sb_2O_5$ are mixed, heated for half an hour at 800° C., pulverised, and then heated for another half hour at 1000° C. Pigments with the crystal structure indicated in the following table are obtained:

| No. | x g. X | y g. $Sb_2O_5$ | Colour | Added compound | X-ray structure |
|---|---|---|---|---|---|
| a | 0.05 g. $Li_2O$ | 1.624 | Beige yellow | $LiSb_3O_8$ | Trirutile. |
| b | 0.50 g. MgO | 4.010 | Beige pink | $MgSb_2O_6$ | Do. |
| c | 0.50 g. ZnO | 1.987 | Beige yellow | $ZnSb_2O_6$ | Do. |
| d | 0.50 g. FeO | 2.252 | Medium yellow olive. | $FeSb_2O_6$ | Do. |
| e | 0.50 g. CoO | 2.160 | Brownish olive. | $CoSb_2O_6$ | Do. |
| f | 0.50 g. NiO | 2.160 | Yellowish olive | $NiSb_2O_6$ | Do. |
| g | 0.50 g. CuO | 2.030 | Olive-tinged yellow. | $CuSb_2O_6$ | Do. |
| h | 0.50 g. $Ga_2O_3$ | 0.863 | Beige brown | $GaSbO_4$ | Trirutile or rutile. |
| i | 0.50 g. $V_2O_5$ | 0.889 | Dark greenish olive. | $VSbO_4$ | Trirutile. |
| k | 0.50 g. $Cr_2O_3$ | 1.070 | Medium yellowish brown. | $CrSbO_4$ | Trirutile or rutile. |

EXAMPLE 187 x g. X, y g. Y and z g. $Sb_2O_5$ are mixed together, heated for half an hour at 800° C., pulverised, and heated for another half hour at 1000° C. Pigments with a trirutile structure are obtained as set out in the following table:

| No. | x g. X | y g. Y | z g. $Sb_2O_5$ | Colour | X-ray structure |
|---|---|---|---|---|---|
| a | 0.50 g. $Li_2O$ | 0.50 g. MgO | 5.634 | Greyish white | Trirutile. |
| b | do | 0.50 g. FeO | 3.876 | Pale greyish brown. | Do. |
| c | do | ZnO 0.50 g | 3.611 | Yellow tinged white. | Do. |
| d | do | 0.50 g. CoO | 3.840 | Brownish beige. | Do. |
| e | do | 0.50 g. NiO | 3.784 | Bluish greenish grey. | Do. |
| f | do | 0.50 g. CuO | 3.654 | Very light yellow. | Do. |

EXAMPLE 188 x g. X, y g. Y and z g. $Sb_2O_5$ are mixed together, heated for half an hour at 800° C., pulverised, and heated for a further half hour at 1000° C. Pigments with a trirutile structure are obtained, as indicated in the table.

| No. | x g. X | y g. Y | z g. $Sb_2O_5$ | Colour | X-ray structure |
|---|---|---|---|---|---|
| a | 0.50 g. MgO | 0.50 g. ZnO | 5.997 | Whitish grey | Trirutile. |
| b | do | 0.50 g. FeO | 6.262 | Brownish grey | Do. |
| c | do | 0.50 g. CoO | 6.170 | Greenish gray | Do. |
| d | do | 0.50 g. NiO | 6.170 | Light greenish grey. | Do. |
| e | do | 0.50 g. CuO | 6.040 | Light grey with yellow tinge. | Do. |

EXAMPLE 189 x g. X, y g. Y and z g. $Sb_2O_5$ are mixed together, heated half an hour at 800° C., pulverised and then heated for another half an hour at 1000° C. Pigments as indicated in the table, and with the X-ray structure set out therein, are obtained.

| No. | x g. X | y g. Y | z g. $Sb_2O_5$ | Colour | X-ray structure |
|---|---|---|---|---|---|
| a | 0.50 g. ZnO | 0.50 g. FeO | 4.239 | Pale greyish brown. | Trirutile. |
| b | do | 0.50 g. CoO | 4.147 | Brownish grey | Do. |
| c | do | 0.50 g. NiO | 4.147 | Greenish grey | Do. |
| d | do | 0.50 g. CuO | 4.017 | Green tinged with grey. | Do. |

EXAMPLE 190 x g. X, y g. Y and z g. $Sb_2O_5$ are mixed together, heated for half an hour at 800° C., pulverised and then heated for another half hour at 1000° C. Pigments as set out in the following table are obtained, these pigments having the crystal structure indicated therein:

| No. | x g. X | y g. Y | z g. $Sb_2O_5$ | Colour | X-ray structure |
|---|---|---|---|---|---|
| a | 0.50 g. FeO | 0.50 g. CoO | 4.412 | Brown | Trirutile. |
| b | do | 0.50 g. NiO | 4.412 | Medium brownish grey. | Do. |
| c | do | 0.50 g. CuO | 4.287 | Light grey | Do. |
| d | 0.50 g. CoO | 0.50 g. NiO | 4.320 | Greyish yellowish brown. | Do. |
| e | do | 0.50 g. CuO | 4.190 | Beige | Do. |
| f | 0.50 g. NiO | do | 4.190 | Light grey | Do. |

EXAMPLE 191 x g. X, y g. $Sb_2O_5$, z g. Z and a g. $Ta_2O_5$ are mixed together heated for half an hour at 800° C., pulverised and then heated for another half hour at 1000° C. Pigments as indicated in the following table are obtained, these pigments having the structure indicated therein.

| No. | x g. X | y g. $Sb_2O_5$ | z g. Z | a g. $Ta_2O_5$ | Colour | X-ray structure |
|---|---|---|---|---|---|---|
| a | 0.50 g. MgO | 1.010 | 0.05 g. $Fe_2O_3$ | 0.548 | Yellowish red | Trirutile. |
| b | do | 1.010 | 0.05 g. CoO | 0.295 | Medium brown. | Do. |
| c | 0.50 g. $Cr_2O_3$ | 1.070 | 0.05 g. NiO | 0.296 | Greyish green | Do. |
| d | do | 1.070 | 0.05 g. FeO | 0.307 | Greenish grey | Do. |
| e | 0.50 g. ZnO | 1.987 | 0.05 g. CuO | 0.278 | Greenish greyish white | Do. |
| f | do | 1.987 | 0.01 g. $Li_2O$ | 0.443 | White | Do. |

EXAMPLE 192 x grams X, y grams $Sb_2O_5$ and z grams $SnO_2$ are mixed together, heated for half an hour at 800° C., pulverised and then heated for another half an hour at 1000° C. Pigments as set out in the following table are obtained, these pigments having the X-ray structure indicated therein:

| No. | x g. X | y g. $Sb_2O_5$ | z g. $SnO_2$ | Colour | X-ray structure |
|---|---|---|---|---|---|
| a | 1.000 g. $Al_2O_3$ | 3.174 | 0.417 | Greyish white | Trirutile (1,100°) |
| b | 1.000 g. $Fe_2O_3$ | 2.020 | 0.302 | Yellowish brown. | Trirutile. |
| c | 1.000 g. $Cr_2O_3$ | 2.140 | 0.314 | Whitish grey | Do. |
| d | 0.500 g. $Ca_2O_3$ | 0.863 | 0.136 | Greyish white | Trirutile (1,100°) |
| e | 0.500 g. $V_2O_5$ | 0.889 | 0.139 | Blackish brown | Trirutile |
| f | 0.100 g. $Li_2O$ | 3.248 | 0.335 | Whitish grey | Do. |
| g | 0.500 g. MgO | 4.010 | 0.451 | do | Do. |
| h | 0.500 g. ZnO | 1.987 | 0.249 | do | Do. |
| i | 0.500 g. FeO | 2.252 | 0.275 | Greyish brown | Do. |
| k | 0.500 g. CoO | 2.160 | 0.266 | Dark greenish grey. | Do. |
| l | 0.500 g. NiO | 2.160 | 0.266 | Green tinged with grey | Trirutile (1,100°) |
| m | 0.500 g. CuO | 2.030 | 0.253 | Greyish brown | Trirutile |

EXAMPLE 193

1.000 gram of ZnO, 3.974 grams of $Sb_2O_5$ and 1.000 gram of $ZrO_2$ (calculated from zirconium nitrate) are mixed together, heated for half an hour at 800° C., pulverised, and then heated for half an hour at 1000° C. A greyish white pigment with a trirutile structure is obtained.

EXAMPLE 194

1.000 gram of $Al_2O_3$, 3.174 grams of $Sb_2O_5$ and 0.500 gram of $GeO_2$ are mixed together, heated for half an hour at 800° C., pulverised, and then heated for another half hour at 1000° C. A dirty white pigment having a disturbed trirutile or rutile structure is obtained.

EXAMPLE 195

2.000 grams of $Cr_2O_3$, 4.280 grams of $Sb_2O_5$ and 1.000 gram of $AlPO_4$ are mixed together, heated for half an hour at 800° C., pulverised, and then heated for a further half hour at 1000° C. A brownish-olive pigment with a trirutile structure is obtained.

EXAMPLE 196

1.000 gram of $Al_2O_3$, 3.174 grams of $Sb_2O_5$ and 0.500 gram of $AlPO_4$ are mixed together, heated for half an hour at 800° C., pulverised, and heated for another half hour at 1000° C. A whitish-grey pigment with a disturbed trirutile structure is obtained.

EXAMPLE 197

1.000 gram of CuO, 4.065 grams of $Sb_2O_5$ and 1.000 gram of $AlAsO_4$ are mixed together, heated for half an hour at 800° C., pulverised, and then heated for another half hour at 900° C. A pale grey pigment with a monoclinic trirutile structure is obtained.

EXAMPLE 198

$x$ grams X, $y$ grams $Sb_2O_5$ and $z$ grams Z are mixed together, heated for half an hour at 800° C., pulverised, and then heated for half an hour at 1000° C. Pigments as set out in the following table are obtained, these pigments having X-ray structures as indicated therein:

| No. | $x$ g. X | $y$ g. $Sb_2O_5$ | $z$ g. Z | Colour | X-ray structure |
|---|---|---|---|---|---|
| a | 1.000 g. $Al_2O_3$ | 3.174 | 0.500 g. $NiF_2$ | Light green | Trirutile disturbed (1,100°) |
| b | ---do--- | 3.174 | 1.000 g. $MgF_2$ | Greyish white | Do. |
| c | ---do--- | 3.174 | 0.500 g. $CoF_2$ | Yellowish grey | Do. |
| d | 1.000 g. $Cr_2O_3$ | 2.140 | 1.000 g. $MgF_2$ | Pale green | Trirutile (1,100°) |
| e | ---do--- | 2.140 | 0.500 g. $CoF_2$ | Green tinged with blue. | Trirutile |
| f | 1.000 g. $Fe_2O_3$ | 2.020 | 1.000 g. $MgF_2$ | Pale red | Do. |
| g | ---do--- | 2.020 | 1.000 g. $MnF_2$ | Dark olive brown | Do. |

EXAMPLE 199

$x$ grams, X, $y$ grams $Sb_2O_5$ and $z$ grams Z are mixed together, heated for half an hour at 800° C., pulverised, and then heated for half an hour at 1000° C. Pigments as indicated in the following table are obtained, these pigments having crystal structures as set out therein:

| No. | $x$ g. X | $y$ g. $Sb_2O_5$ | $z$ g. Z | Colour | X-ray structure |
|---|---|---|---|---|---|
| a | 0.500 g. MgO | 4.010 | 0.500 g. $NiF_2$ | Very light green. | Trirutile. |
| b | 0.500 g. ZnO | 1.987 | 1.000 g. $ZnF_2$ | Yellowish white. | Trirutile disturbed. |
| c | 0.500 g. NiO | 2.160 | 0.500 g. $NiF_2$ | Lime green | Trirutile. |
| d | 0.500 g. CuO | 2.030 | 1.000 g. $MgF_2$ | Pink | Do. |
| e | 0.500 g. $Al_2O_3$ | 3.174 | 0.500 g. NiO + 0.562 g. $AlF_3$ | Very light blue. | Do. |

EXAMPLE 200

1.000 gram of ZnO, 3.974 grams of $Sb_2O_5$ and 0.020 gram of $CaF_2$ are mixed together, heated for half an hour at 800° C., pulverised, and then heated for half an hour at 1000° C. A greyish pigment having a trirutile structure is obtained.

EXAMPLE 201

2.000 grams of $Fe_2O_3$, 4.040 grams of $Sb_2O_5$ and 0.500 gram of $CaF_2$ are mixed together, heated for half an hour at 800° C., pulverised, and then heated for half an hour at 1000° C. A medium brown pigment with a trirutile structure is obtained.

EXAMPLE 202

1.000 gram of ZnO, 3.974 of $Sb_2O_5$ and 0.500 gram of $CdF_2$ are mixed together, heated for half an hour at 800° C., pulverised, and then heated for another half hour at 1000° C. A greyish-white pigment with a yellowish tinge and having a somewhat disturbed trirutile structure is obtained.

EXAMPLE 203

1.000 gram of $Al_2O_3$ (calculated from $Al(OH)_3$) and 3.174 grams of $Sb_2O_5$ are mixed with $x$ grams X and $y$ grams LiF, heated for half an hour at 800° C., pulverised and then heated for half an hour at 1000° C. Pigments as set out in the following table are obtained, these pigments having X-ray structures, as indicated therein:

| No. | $x$ g. X | $y$ g. LiF | Colour | X-ray structure |
|---|---|---|---|---|
| a | 0.500 g. $AlF_3$ | 0.155 | White | Trirutile. |
| b | 0.500 g. $FeF_3$ | 0.115 | Grey tinged with yellow. | Do. |
| c | 0.500 g. $CrF_3$ | 0.119 | Whitish yellow | Do. |
| d | 0.500 g. $GaF_3$ | 0.102 | White | Do. |

EXAMPLE 204

1.000 gram of $Fe_2O_3$, 2.020 grams of $Sb_2O_5$, $x$ grams X and $y$ grams LiF are mixed together, heated for half an hour at 800° C., pulverised, and then heated for another half hour at 1000° C. Pigments as set out in the following table are obtained, these pigments having crystal structures as indicated therein:

| No. | $x$ g. X | $y$ g. LiF | Colour | X-ray structure |
|---|---|---|---|---|
| a | 0.500 g. $AlF_3$ | 0.155 | Reddish orange | Trirutile. |
| b | 0.500 g. $CoF_3$ | 0.115 | Olive green tinged with brown. | Do. |
| c | 0.500 g. $FeF_3$ | 0.119 | Yellowish brown | Do. |
| d | 0.500 g. $GaF_3$ | 0.102 | Brownish orange | Do. |

EXAMPLE 205

1.000 gram of ZnO, 3.974 grams of $Sb_2O_5$, $x$ grams X and $y$ grams LiF are mixed together, heated for half an hour at 800° C., pulverised, and then heated for another half hour at 1000° C. Pigments as set out in the following table are obtained, these pigments having X-ray structures as indicated therein:

| No. | $x$ g. X | $y$ g. LiF | Colour | X-ray structure |
|---|---|---|---|---|
| a | 0.500 g. $AlF_3$ | 0.155 | White tinged with yellow. | Trirutile. |
| b | 0.500 g. $CrF_3$ | 0.115 | Greyish brown | Do. |
| c | 0.500 g. $FeF_3$ | 0.119 | Light beige | Do. |
| d | 0.500 g. $GaF_3$ | 0.102 | White | Do. |

EXAMPLE 206

1.000 gram of $Cr_2O_3$, 2.140 grams of $Sb_2O_5$, $x$ grams

X and y grams $Li_2O$ (calculated from $Li_2CO_3$) are mixed together, heated for half an hour at 800° C., pulverised and then heated for another half hour at 1000° C. Pigments as indicated in the following table are obtained, these pigments having crystal structures as indicated therein:

| No. | x g. X | y g. $Li_2O$ | Colour | X-ray structure |
|---|---|---|---|---|
| a | 0.250 g. $AlF_3$ | 0.0296 | Dirty green | Trirutile. |
| b | 0.250 g. $CrF_3$ | 0.0228 | Greyish green | Trirutile disturbed. |
| c | 0.250 g. $FeF_3$ | 0.0220 | Greenish grey | Do. |
| d | 0.250 g. $GaF_3$ | 0.0196 | Greyish green | Do. |

EXAMPLE 207

1.000 gram of CoO and 4.432 grams of $Sb_2O_5$ are mixed with x grams X and y grams $Li_2O$ (calculated from $Li_2CO_3$), heated for half an hour at 800° C., pulverised and then heated for another half hour at 1000° C. Pigments as described in the following table are obtained, these pigments having structures as set out therein:

| No. | x g. X | y g. $Li_2O$ | Colour | X-ray structure |
|---|---|---|---|---|
| a | 0.500 g. $AlF_3$ | 0.0592 | Greyish green | Trirutile. |
| b | 0.500 g. $CrF_3$ | 0.0456 | Greyish green tinged with brown | Do. |
| c | 0.500 g. $FeF_3$ | 0.044 | Brown tinged with olive | Do. |
| d | 0.500 g. $GaF_3$ | 0.0392 | Green tinged with grey | Do. |

EXAMPLE 208

1.000 gram of $Al_2O_3$, 3.174 grams of $Sb_2O_5$, x grams X and y grams Y are mixed together, heated for half an hour at 800° C., pulverised, and then heated for another half hour at 1000° C. Pigments as set out in the following table are obtained, these pigments having X-ray structures as indicated therein:

| No. | x g. X | y g. Y | Colour | X-ray structure |
|---|---|---|---|---|
| a | 0.500 g. $AlF_3$ | 0.446 g. CoO | Light blue | Trirutile disturbed. |
| b | do | 0.240 g. MgO | Whitish grey | Do. |
| c | do | 0.422 g. MnO | Brown tinged with yellow | Trirutile. |
| d | do | 0.428 g. FeO | Yellowish beige | Do. |
| e | do | 0.474 g. CuO | Greyish pink | Do. |

EXAMPLE 209

0.500 gram of MgO, 4.010 grams of $Sb_2O_5$, x grams X and y grams Y are mixed together, heated for half an hour at 800° C., pulverised, and then heated for another half hour at 1000° C. Pigments as set out in the following table are obtained, these pigments having crystal structures as mentioned therein:

| No. | x g. X | y g. Y | Colour | X-ray structure |
|---|---|---|---|---|
| a | 0.500 g. $CrF_3$ | 0.344 g. CoO | Greyish green | Trirutile. |
| b | do | 0.343 g. NiO | Green tinged with blue | Do. |
| c | do | 0.325 g. MnO | Light-brown | Do. |
| d | do | 0.330 g. FeO | do | Do. |

EXAMPLE 210

1.000 gram of $Al_2O_3$, 3.174 grams of $Sb_2O_5$, x grams X and y grams Y are mixed together, heated for half an hour at 800° C., pulverised, and then heated for another half hour at 1000° C. Pigments as set out in the following table are obtained, these pigments having the X-ray structures indicated therein:

| No. | x g. X | y g. Y | Colour | X-ray structure |
|---|---|---|---|---|
| a | 0.250 g. $AlF_3$ | 0.475 g. $Fe_2O_3$ | Light-grey | Trirutile disturbed (1,100°). |
| b | 0.250 g. $FeF_3$ | 0.226 g. $Al_2O_3$ | do | Trirutile disturbed. |
| c | 0.250 g. $CrF_3$ | 0.234 g. $Al_2O_3$ | do | Trirutile disturbed (1,100°). |
| d | do | 0.366 g. $Fe_2O_3$ | Yellowish brown | Trirutile disturbed. |

EXAMPLE 211

0.100 gram of $Li_2O$ (calculated from $Li_2CO_3$) and 3.248 grams of $Sb_2O_5$, are mixed with x grams $MeF_3$ and y grams Y, heated for half an hour at 800° C. pulverised and then heated for another half hour at 1000° C. Pigments as indicated in the following table are obtained, these pigments having the structures set out therein:

| No. | x g. X | y g. Y | Colour | X-ray structure |
|---|---|---|---|---|
| a | 0.250 g. $AlF_3$ | 0.475 g. $Fe_2O_3$ | Beige | Trirutile disturbed. |
| b | 0.250 g. $GaF_3$ | 0.300 g. $Cr_2O_3$ | Grey | Trirutile. |
| c | 0.250 g. $CrF_3$ | 0.349 g. $Cr_2O_3$ | do | Trirutile somewhat disturbed. |
| d | do | 0.234 g. $Al_2O_3$ | Whitish grey | Trirutile disturbed. |

EXAMPLE 212

0.500 gram of NiO, 2.160 grams of $Sb_2O_5$, x grams X and y grams LiF, are mixed together, heated for half an hour at 800° C., pulverised, and then heated for another half hour at 1000° C. Pigments as set out in the following table are obtained, these pigments having the crystal structures indicated therein:

| No. | x g. X | y g. LiF | Colour | X-ray structure |
|---|---|---|---|---|
| a | 0.250 g. $Bi_2O_5$ | 0.0130 | Bluish green | Trirutile disturbed. |
| b | 0.250 g. $Nb_2O_5$ | 0.0244 | Greyish green | Trirutile somewhat disturbed. |
| c | 0.250 g. $V_2O_5$ | 0.0357 | Olive green | Trirutile. |
| d | 0.250 g. $Ta_2O_5$ | 0.0147 | Bluish grey | Do. |

EXAMPLE 213

1.000 grams of $Ga_2O_3$, 1.726 grams of $Sb_2O_5$, x grams X and y grams LiF are mixed together, heated for half an hour at 800° C. pulverised, and then heated for another half hour at 1000° C. Pigments as set out in the following table are obtained, these pigments having the X-ray crystal structures indicated therein:

| No. | x g. X | y g. LiF | Colour | X-ray structure |
|---|---|---|---|---|
| a | 0.250 g. $MoO_3$ [a] | 0.0451 | Light grey | Trirutile. |
| b | 0.250 g. $WO_3$ | 0.0280 | White | Do. |
| c | 0.250 g. $UO_3$ | 0.0227 | Greenish grey | Trirutile somewhat disturbed. |
| d | 0.250 g. $TeO_3$ | 0.0369 | Yellowish white | Trirutile very good. |

[a] In the case of $MoO_3$, the heating was carried out for half an hour at 700° C., and for another half an hour at 800° C., after pulverisation, on account of its volatility.

EXAMPLE 214

1.000 gram of $Al_2O_3$ and 3.174 grams of $Sb_2O_5$ are mixed with 0.500 gram of CoO, 1.546 grams of $DO_3$ and 0.200 gram of NaF, heated for half an hour at 800° C., pulverised, and then heated for another half hour at 1000° C. A grey pigment with a greenish tinge is obtained, this pigment having a trirutile structure.

EXAMPLE 215

1.000 gram of $Al_2O_3$, 3.174 grams of $Sb_2O_5$, 0.500 gram of ZnO, 1.425 grams of $WO_3$ and 0.200 gram of NaF are mixed together, heated for half an hour at 800° C., pulverised, and then heated for another half hour at 1000° C. A greyish white pigment is obtained, this pigment having a disturbed trirutile structure.

EXAMPLE 216

1.000 gram of $Al_2O_3$, 3.174 grams of $Sb_2O_5$, 0.500 gram of NiO and 1.915 grams of $UO_3$ are mixed together, heated for half an hour at 800° C., pulverised, and then heated for another half hour at 1000° C. A greyish green pigment having a disturbed trirutile structure is obtained.

EXAMPLE 217

1.000 gram of $Al_2O_3$ and 3.174 grams of $Sb_2O_5$, 0.050 gram of $Li_2O$ and 0.722 gram of $MoO_3$ are mixed together, heated for half an hour at 700° C., pulverised, and then heated for another half hour at 800° C. A greenish-grey pigment which has a disturbed trirutile structure is obtained.

EXAMPLE 218

1.000 gram of $Al_2O_3$, 3.174 grams of $Sb_2O_5$, 0.500 gram of $Fe_2O_3$ and 0.726 gram of $WO_3$ are mixed together, heated for half an hour at 800° C., pulverised, and then heated for another half hour at 1000° C. A greyish-olive green pigment is obtained, this pigment having a finely divided trirutile structure.

EXAMPLE 219

0.100 gram of $Al_2O_3$+0.317 gram of $Sb_2O_5$+0.100 gram of $Fe_2O_3$+0.202 gram of $Sb_2O_5$+0.100 gram of $Cr_2O_3$+0.214 gram of $Sb_2O_5$+0.050 gram of $Li_2O$+1.624 grams of $Sb_2O_5$+0.050 gram of ZnO+0.198 gram of $Sb_2O_5$+0.050 gram of NiO+0.216 gram of $Sb_2O_5$+0.050 gram of CuO+0.203 gram of $Sb_2O_5$+0.500 gram of $MgF_2$+0.200 gram of LiF+0.087 gram of $AlF_3$+0.200 gram of $CrF_3$+0.0183 gram of $Li_2O$+0.250 gram of $AlF_3$+0.223 gram of CoO+0.100 gram of $AlF_3$+0.181 gram of $Cr_2O_3$+0.200 gram of $Nb_2O_5$+0.0195 gram of LiF+0.300 gram of $WO_3$+0.336 gram of LiF are mixed together, heated for half an hour at 800° C., pulverised, and then heated for another half hour at 1000° C. A brown pigment with an olive tinge is obtained, this pigment having a trirutile structure.

I claim:
1. Solid solutions consisting of rutile lattice forming compounds selected from the group consisting of $TiO_2$, $SnO_2$, $\beta$-$MnO_2$, $PbO_2$, $VO_2$, $GeO_2$, $TeO_2$, $CrO_2$, $RuO_2$, $OsO_2$, $IrO_2$, $MgF_2$, $ZnF_2$, $MnF_2$, $FeF_2$, $CoF_2$, $NiF_2$, $PdF_2$, $LiSb_3O_8$, $MgSb_2O_6$, $ZnSb_2O_6$, $FeSb_2O_6$, $CoSb_2O_6$, $NiSb_2O_6$, $CuSb_2O_6$, $AlSbO_4$, $GaSbO_4$, $VSbO_4$, $CrSbO_4$, $FeSbO_4$, $RhSbO_4$, $MgTa_2O_6$, $NiTa_2O_6$, $CoTa_2O_6$, $FeTa_2O_6$, $CrTaO_4$, $FeTaO_4$, $RhTaO_4$, $CrNbO_4$, $FeNbO_4$, $RhNbO_4$ and $RhVO_4$, and additional compounds selected from the group consisting of 2-valent metal fluorides, 1-, 2- and 3-valent metal oxides and fluorides, 5- and 6-valent metal oxides, mixtures thereof and mixtures of 2-valent metal fluorides, 1-, 2- and 3-valent metal oxides and fluorides and 5- and 6-valent metal oxides with 4-valent metal oxides, the cations of said additional compounds possess radii between 0.46 A. and 0.91 A., and said additional compounds being present in such proportions, relatively to one another, that the ratio of the sum of their cations to the sum of their anions is 1:2 (±2%) while preserving statistical electroneutrality in the lattice.

2. Solid solutions according to claim 1, wherein the total amount of the additional components is not greater than the total amount of rutile lattice forming components.

3. Solid solutions according to claim 2, wherein the total content of the additional components is between about 0.5 and about 50 percent by weight.

4. Solid solutions according to claim 1, wherein the rutile lattice forming component is titanium dioxide.

5. Solid solutions according to claim 1, wherein the rutile lattice forming component is tin dioxide.

6. Solid solutions according to claim 1, wherein the rutile lattice forming component is selected from the group consisting of an antimonate, niobate, tantalate and vanadate.

7. A process for the production of solid solutions according to claim 1, wherein the rutile lattice forming components are heated from 1 to 3 hours with the additional components at temperatures of about 600°–1350° C. so as to form the solid solutions.

8. Solid solutions according to claim 1 wherein the rutile lattice forming compound is $TiO_2$ and the additional compounds are $Cr_2O_3$ and $Sb_2O_5$.

References Cited in the file of this patent

UNITED STATES PATENTS

| | | |
|---|---|---|
| 2,437,171 | Pechukas | May 2, 1948 |
| 2,756,157 | Beals et al. | July 24, 1956 |
| 2,796,358 | Foss | June 18, 1957 |
| 2,875,085 | Morris et al. | Feb. 24, 1959 |

FOREIGN PATENTS

| | | |
|---|---|---|
| 384,473 | Great Britain | Dec. 8, 1932 |
| 448,345 | Great Britain | June 8, 1936 |
| 472,605 | Great Britain | Sept. 24, 1937 |

OTHER REFERENCES

Johnson et al.: Journal of the American Ceramic Society, volume 32, No. 12, 1949, pages 398–401.

UNITED STATES PATENT OFFICE
CERTIFICATE OF CORRECTION

Patent No. 3,022,186

February 20, 1962

Franz Hund

It is hereby certified that error appears in the above numbered patent requiring correction and that the said Letters Patent should read as corrected below.

column 13, lines 3 and 31, for "$Cb_2O_5$", each occurrence, read -- $Sb_2O_5$ --; column 32, second table, column 2, line 2 thereof, for "$GAF_3$" read -- $GaF_3$ --; line 67, for "$DO_3$" read -- $WO_3$ --.

Signed and sealed this 24th day of July 1962.

(SEAL)
Attest:

ERNEST W. SWIDER
Attesting Officer

DAVID L. LADD
Commissioner of Patents